(12) United States Patent
Kuroda et al.

(10) Patent No.: US 11,415,976 B2
(45) Date of Patent: Aug. 16, 2022

(54) DIAGNOSIS DEVICE, LEARNING DEVICE, AND DIAGNOSIS SYSTEM

(71) Applicants: Masaru Kuroda, Tokyo (JP); Keishi Iwata, Kanagawa (JP)

(72) Inventors: Masaru Kuroda, Tokyo (JP); Keishi Iwata, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 821 days.

(21) Appl. No.: 16/321,892

(22) PCT Filed: Aug. 8, 2017

(86) PCT No.: PCT/JP2017/028808
§ 371 (c)(1),
(2) Date: Jan. 30, 2019

(87) PCT Pub. No.: WO2018/030422
PCT Pub. Date: Feb. 15, 2018

(65) Prior Publication Data
US 2019/0179297 A1 Jun. 13, 2019

(30) Foreign Application Priority Data

Aug. 9, 2016 (JP) .............................. JP2016-156940

(51) Int. Cl.
*G05B 23/02* (2006.01)
*G06N 20/00* (2019.01)
*G05B 19/406* (2006.01)

(52) U.S. Cl.
CPC ....... *G05B 23/0254* (2013.01); *G05B 19/406* (2013.01); *G06N 20/00* (2019.01); *G05B 2219/32356* (2013.01)

(58) Field of Classification Search
CPC .. G01R 31/367; G01R 31/387; G01R 31/389; G01R 31/3865; G01R 31/385;
(Continued)

(56) References Cited

U.S. PATENT DOCUMENTS 5,253,184 A 10/1993 Kleinschnitz
8,532,865 B2 * 9/2013 Suzuki .................... E02F 9/268
701/29.1
(Continued)

FOREIGN PATENT DOCUMENTS

CN 102326066 A 1/2012
CN 105372534 A 3/2016
(Continued)

OTHER PUBLICATIONS

Japanese Office Action dated Aug. 25, 2020.
(Continued)

*Primary Examiner* — Mohammad K Islam
(74) *Attorney, Agent, or Firm* — Harness, Dickey & Pierce P.L.C.

(57) ABSTRACT

A diagnosis device includes a first acquiring unit acquires, from a target device, context information corresponding to a current operation; a second acquiring unit acquires detection information output from a detecting unit that detects a physical quantity that changes according to operations performed by the target device; a first transmitting unit transmits the acquired context information to a learning device; a second transmitting unit transmits the acquired detection information to the learning device; a third acquiring unit acquires a model corresponding to the transmitted context information, from the learning device that determines whether any pieces of context information are identical or similar to each other and combines models generated from pieces of the detection information corresponding to the pieces of identical or similar context information; and a first determining unit determines whether an operation performed by the target device is normal by using the detection information and the model.

10 Claims, 24 Drawing Sheets

(58) Field of Classification Search
CPC .......... G01R 31/396; G06N 3/04; G06N 3/08; G06N 3/0454; Y02W 30/84; Y02E 60/10; H01M 10/4285; H01M 10/54
See application file for complete search history.

(56) References Cited

U.S. PATENT DOCUMENTS

| | | | |
|---|---|---|---|
| 10,679,434 B2* | 6/2020 | Okude | G06F 30/15 |
| 10,732,606 B2* | 8/2020 | Higashi | G05B 19/406 |
| 10,831,577 B2* | 11/2020 | Okanohara | G06N 3/08 |
| 2007/0088454 A1* | 4/2007 | Jalluri | G05B 19/4065 |
| | | | 700/159 |
| 2012/0166142 A1 | 6/2012 | Maeda et al. | |
| 2013/0173218 A1 | 7/2013 | Maeda et al. | |
| 2015/0160098 A1 | 6/2015 | Noda et al. | |
| 2015/0220847 A1 | 8/2015 | Shibuya et al. | |

FOREIGN PATENT DOCUMENTS

| | | |
|---|---|---|
| CN | 105391579 A | 3/2016 |
| JP | 2012-058890 A | 3/2012 |
| JP | 2012-164140 A | 8/2012 |
| JP | 5363927 | 9/2013 |
| JP | 5530020 | 4/2014 |
| JP | 5747012 | 5/2015 |
| JP | 2017-120622 | 7/2017 |
| WO | WO-91/10205 A1 | 7/1991 |
| WO | 2017/111072 A1 | 6/2017 |

OTHER PUBLICATIONS

Chinese Office Action and English translation thereof dated Feb. 22, 2021.

International Search Report dated Mar. 1, 2018 in PCT/JP2017/028808.

* cited by examiner

FIG.12

| MACHINE TOOL No. | PROCESSING CONDITION ||||| FEATURE INFORMATION | GENERATED MODEL |
| | PROCESSING DEVICE IDENTIFICATION INFORMATION | MOTOR ROTATIONAL SPEED | DRILL DIAMETER | DRILL MATERIAL | PROCESSING SPEED | | |
| --- | --- | --- | --- | --- | --- | --- | --- |
| 1 | TypeA | 8000 | Φ3.0 | CEMENTED CARBIDE | 1250 | No1_file | No1_model |
| 2 | TypeA | 10000 | Φ3.0 | CERMET | 1250 | No2_file | No2_model |
| 3 | TypeA | 6000 | Φ3.0 | CARBON STEEL | 1250 | No3_file | No3_model |
| 4 | TypeB | 8000 | Φ3.0 | CEMENTED CARBIDE | 1250 | No4_file | No4_model |
| 5 | TypeA | 8000 | Φ3.0 | CEMENTED CARBIDE | 1250 | No5_file | No5_model |
| 6 | TypeC | 8000 | Φ5.0 | CEMENTED CARBIDE | 1500 | No6_file | No6_model |
| 7 | TypeB | 8000 | Φ3.0 | CERMET | 1250 | No7_file | No7_model |

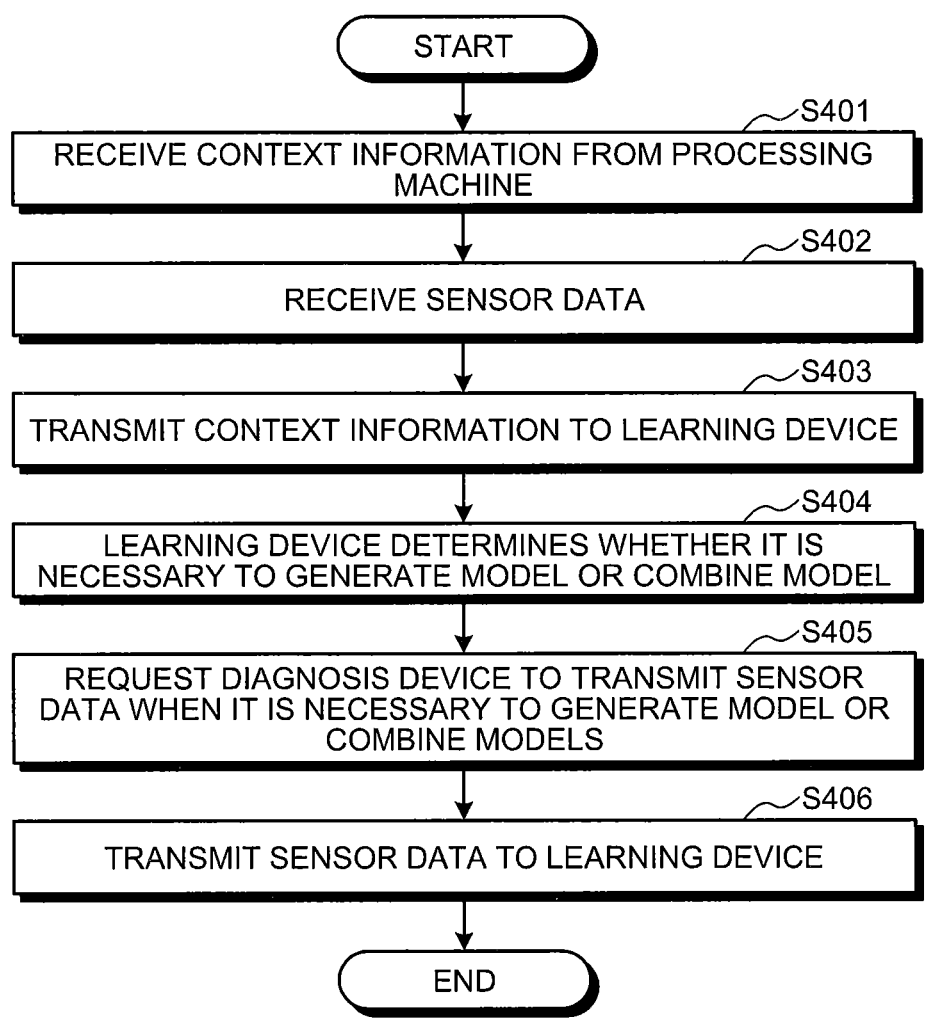

| No. | HASH VALUE | RECEPTION DATE/ TIME | SENSOR DATA LINK |
|---|---|---|---|
| 1 | fassss1121·· | 03:03/12/14/2015 | Sound.File.1 |
| 2 | fsdakjlh11··· | 03:03/12/14/2015 | Sound.File.1 |
| 3 | fsdakjlh12··· | 03:03/01/14/2016 | Sound.File.2 |

| No. | HASH VALUE | LEARNED MODEL | LEARNING RANGE |
|---|---|---|---|
| 1 | fassss1121··· | fassss1121_2015 | 00:00/01/01/2015-03:03/12/14/2015 |
| 2 | fsdakjlh11··· | fsdakjlh11_2015 | 00:00/01/01/2015-03:03/12/14/2015 |
| 3 | fsdakjlh12··· | fsdakjlh11_2016 | 00:00/01/01/2016-03:03/01/14/2016 |

| SENSOR DATA | CONTEXT INFORMATION |
|---|---|
| ACCELERATION SENSOR | MOTOR A IS DRIVEN, ... |
| ACOUSTIC SENSOR | MOTOR B IS DRIVEN, ... |

DIAGNOSIS DEVICE, LEARNING DEVICE, AND DIAGNOSIS SYSTEM

TECHNICAL FIELD

The present invention relates to a diagnosis device, a learning device, and a diagnosis system.

BACKGROUND ART

With regard to a machine tool, such as a processing machine (machining), there is a known technology for determining whether there is an abnormality in operations of the machine tool by comparing operating sound data collected by a sound collecting unit and operating sound data prepared in advance, for each of operating states based on processing conditions (machining conditions). In general, a method of monitoring detection information, such as detected (collected) operating sound data, and comparing the detection information with a set threshold is used to detect an abnormality. In this case, with respect to pieces of learning data, pieces of data having high similarities to the detection information are linearly combined to calculate an estimated value, and the degree of deviation between the estimated value and observed data is obtained. Then, whether there is an abnormality in the detection information is determined based on the similarity between the detection information to be evaluated and the modeled learning data.

As a technology for determining an abnormality in operations as described above, a technology has been disclosed in which a learning model is generated from a plurality of pieces of sensor data and an abnormality is determined based on a difference in the similarity to observed data (see Japanese Patent No. 5363927).

SUMMARY OF INVENTION

Technical Problem

However, in the technology described in Japanese Patent No. 5363927, in generating the learning model, whether an abnormality has occurred or not is taken into account as the degree of influence to generate the model and to set a control threshold; therefore, to obtain a correct result of abnormality determination, it is necessary to cause an abnormality itself to occur several times to perform the abnormality determination with high accuracy. Furthermore, in generating the learning model, it is necessary to re-input a result of the abnormality determination for each of individual facilities; therefore, it takes a long time to improve the accuracy or the maturity of the learning model.

The present invention has been made in view of the problems as described above, and an object is to provide a diagnosis device, a learning device, and a diagnosis system capable of improving the accuracy in diagnosis of an abnormality.

Solution to Problem

According to one aspect of the present invention, a diagnosis device includes a first acquiring unit, a second acquiring unit, a first transmitting unit, a second transmitting unit, a third acquiring unit, and a first determining unit. The first acquiring unit is configured to acquire, from a target device, a piece of context information corresponding to a current operation among a plurality of pieces of context information determined for respective kinds of operations performed by the target device. The second acquiring unit is configured to acquire a piece of detection information output from a detecting unit that detects a physical quantity that changes according to operations performed by the target device. The first transmitting unit is configured to transmit the piece of the context information acquired by the first acquiring unit to a learning device. The second transmitting unit is configured to transmit the piece of the detection information acquired by the second acquiring unit to the learning device. The third acquiring unit is configured to acquire a model corresponding to the piece of the context information transmitted by the first transmitting unit, from the learning device that determines whether any pieces of context information among the plurality of pieces of context information are identical or similar to each other and combines models generated from pieces of the detection information corresponding to the pieces of context information determined to be identical or similar to each other. The first determining unit is configured to determine whether an operation performed by the target device is normal or not by using the piece of the detection information acquired by the second acquiring unit and the model acquired by the third acquiring unit.

Advantageous Effects of Invention

According to one aspect of the present invention, it is possible to improve the accuracy in diagnosis of an abnormality.

BRIEF DESCRIPTION OF DRAWINGS

FIG. 12 is a schematic diagram illustrating an example of a table for associating the context information and the model.

FIG. 13 is a flowchart illustrating an example of an operation of transmitting sensor data that is determined as necessary by a learning device according to a modification 1-2 of the first embodiment.

FIG. 33-1 is a schematic diagram for explaining an example of a determination method according to a fifth modification.

FIG. 33-2 is a schematic diagram for explaining an example of the determination method according to the fifth modification.

FIG. 33-3 is a schematic diagram for explaining an example of the determination method according to the fifth modification.

FIG. 34-1 is a schematic diagram for explaining an example of a determination method according to a sixth modification.

FIG. 34-2 is a schematic diagram for explaining an example of the determination method according to the sixth modification.

FIG. 34-3 is a schematic diagram for explaining an example of the determination method according to the sixth modification.

DESCRIPTION OF EMBODIMENTS

Exemplary embodiments of a diagnosis device, a learning device, and a diagnosis system according to the present invention will be described in detail below with reference to the accompanying drawings.

First Embodiment

Overall Configuration of Diagnosis System

Figure 1:
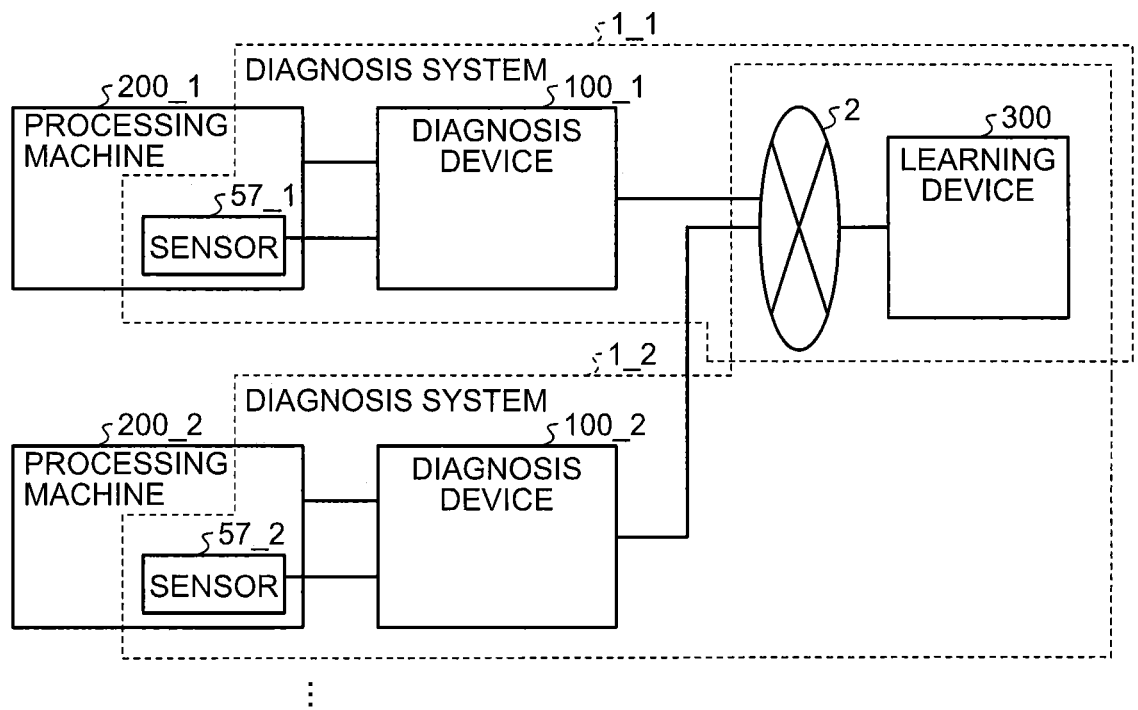
FIG. 1 is a schematic diagram illustrating an example of an overall configuration of a diagnosis system according to a first embodiment.

FIG. 1 is a schematic diagram illustrating an example of an overall configuration of a diagnosis system according to a first embodiment. With reference to FIG. 1, an overall configuration of a diagnosis system 1 according to the first embodiment will be described.

As illustrated in FIG. 1, for example, a diagnosis system 1_1 includes a sensor 57_1 mounted in a processing machine 200_1, a diagnosis device 100_1, and a learning device 300. Furthermore, a diagnosis system 1_2 includes a sensor 57_2 mounted in a processing machine 200_2, a diagnosis device 100_2, and a learning device 300.

Hereinafter, an arbitrary one of the diagnosis systems 1_1 and 1_2 or both of the diagnosis systems 1_1 and 1_2 will simply or collectively be referred to as a "diagnosis system 1". An arbitrary one of the diagnosis devices 100_1 and 100_2 or both of the diagnosis devices 100_1 and 100_2 will simply or collectively be referred to as a "diagnosis device 100". An arbitrary one of the processing machines 200_1 and 200_2 or both of the processing machines 200_1 and 200_2 will simply or collectively be referred to as a "processing machine 200". An arbitrary one of the sensors 57_1 and 57_2 or both of the sensors 57_1 and 57_2 will simply or collectively be referred to as a "sensor 57". That is, the diagnosis system 1 includes the sensor 57 mounted in the processing machine 200, the diagnosis device 100, and the learning device 300. The processing machine 200 is an example of a target device to be diagnosed by the diagnosis device 100.

The diagnosis device 100 is a device that diagnoses an abnormality in operations of the processing machine 200. As illustrated in FIG. 1, the diagnosis device 100 can communicate with the learning device 300 via a network 2. The network 2 is a dedicated connecting wire, a wired network, such as a wired local area network (LAN), a wireless network, the Internet, or the like.

The processing machine 200 is a machine tool that performs processing, such as cutting, grounding, or polishing, on a processing target by using a tool. The processing machine 200 is an example of a target device to be diagnosed by the diagnosis device 100.

The learning device 300 is a server device that generates a model used in a diagnosis process performed by the diagnosis device 100, through a learning process using detection information received from the diagnosis device 100. The learning device 300 may be provided in a cloud computing service.

The sensor 57 detects a physical quantity, such as vibrations or sounds, generated by a tool, such as a drill, an end mill, a bit tip, or a grinding stone, mounted in the processing machine 200, and outputs information on the detected physical quantity as detection information (sensor data) to the diagnosis device 100. The sensor 57 includes, for example, a microphone, an acceleration sensor, an acoustic emission (AE) sensor, or the like.

The processing machine 200 and the diagnosis device 100 may be connected to each other in any connection configurations. For example, the processing machine 200 and the diagnosis device 100 are connected to each other with a dedicated connecting wire, a wired network, such as a wired LAN, a wireless network, or the like.

It may be possible to provide an arbitrary number of the sensors 57. It may be possible to provide a plurality of the sensors 57 that detect the same physical quantity, or provide a plurality of the sensors 57 that detect different physical quantities.

The sensor 57 may be equipped in the processing machine 200 in advance, or may later be attached to the processing machine 200 that is a complete machine.

Hardware Configuration of Processing Machine

Figure 2:
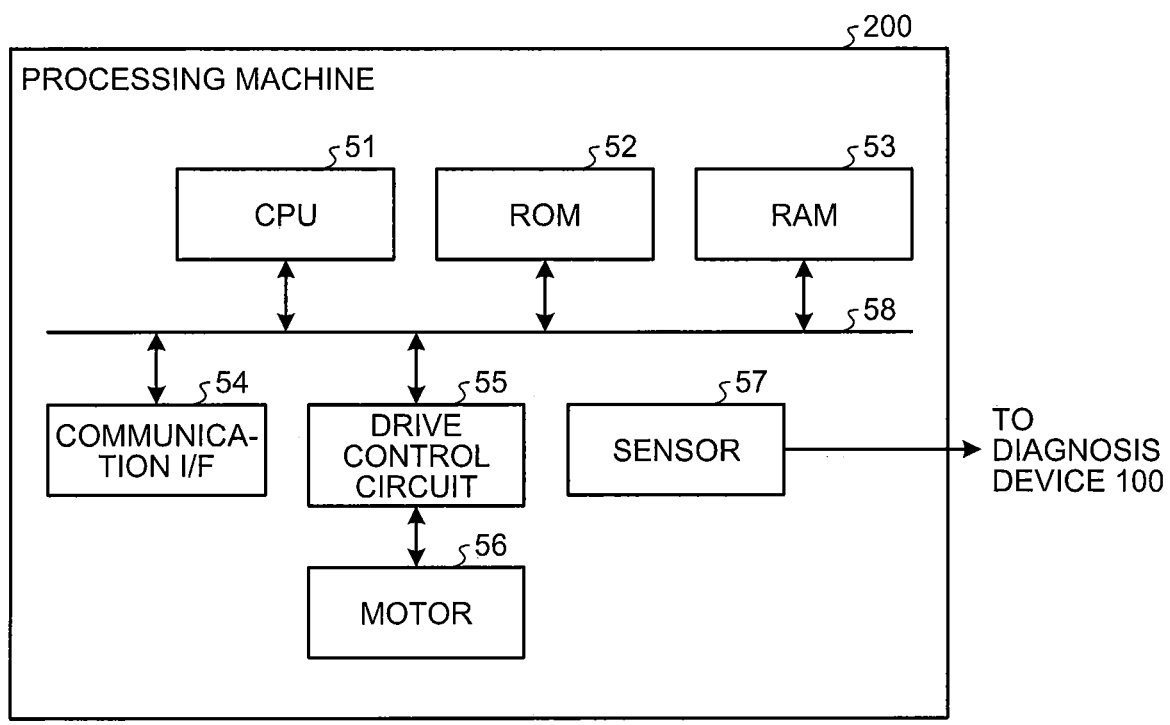
FIG. 2 is a schematic diagram illustrating an example of a hardware configuration of a processing machine according to the first embodiment.

FIG. 2 is a schematic diagram illustrating an example of a hardware configuration of the processing machine according to the first embodiment. As illustrated in FIG. 2, the processing machine 200 includes a central processing unit (CPU) 51, a read only memory (ROM) 52, a random access memory (RAM) 53, a communication interface (I/F) 54, and a drive control circuit 55, all of which are connected to each other via a bus 58. The sensor 57 is communicably connected to the diagnosis device 100.

The CPU 51 controls the entire processing machine 200. For example, the CPU 51 executes a program stored in the ROM 52 or the like by using the RAM 53 as a work area (workspace) to control the entire operation of the processing machine 200 and implement a processing function.

The communication I/F 54 is an interface to communicate with an external apparatus, such as the diagnosis device 100. The drive control circuit 55 is a circuit that controls drive of a motor 56. The motor 56 drives a tool, such as a drill, a grinding stone, a cutter, or a table, used for processing. The sensor 57 detects a physical quantity (for example, a vibration waveform of a tool driven to rotate by the motor 56) that changes according to operations performed by the processing machine 200, and outputs detection information on the physical quantity to the diagnosis device 100.

Hardware Configuration of Diagnosis Device and Learning Device

Figure 3:
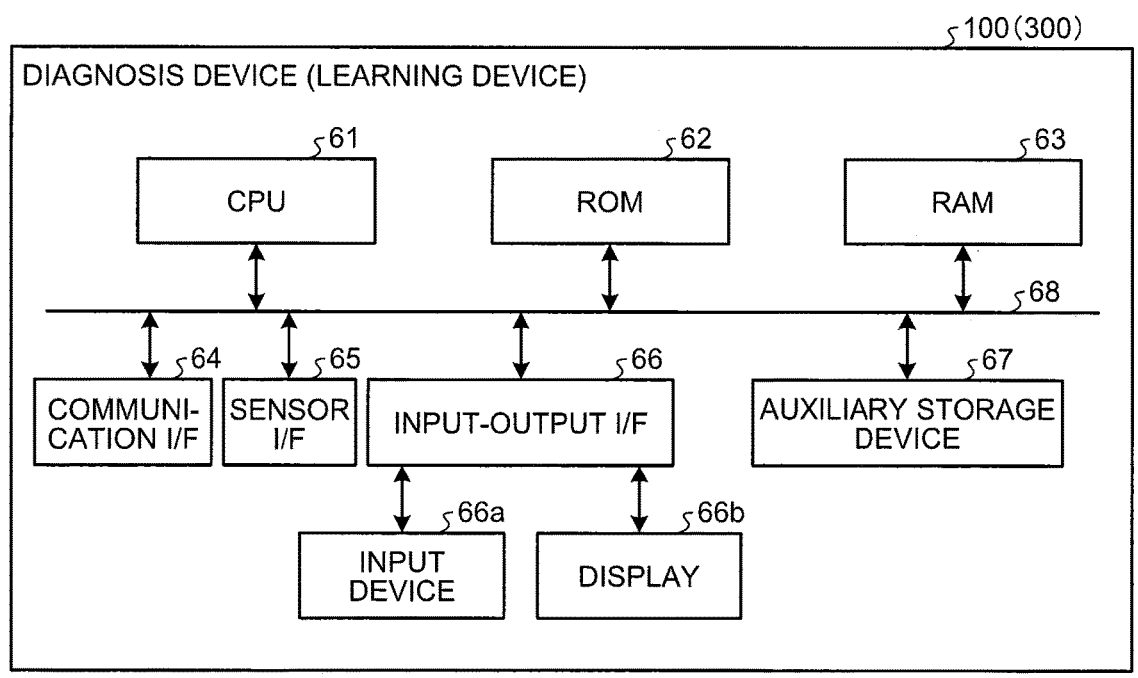
FIG. 3 is a schematic diagram illustrating an example of a hardware configuration of a diagnosis device and a learning device according to the first embodiment.

FIG. 3 is a schematic diagram illustrating an example of a hardware configuration of the diagnosis device and the learning device according to the first embodiment. Hereinafter, the hardware configuration of the diagnosis device 100 will be described as an example. The learning device 300 has the same hardware configuration.

As illustrated in FIG. 3, the diagnosis device 100 includes a CPU 61, a ROM 62, a RAM 63, a communication I/F 64, a sensor I/F 65, an input-output I/F 66, and an auxiliary storage device 67, all of which are connected to each other via a bus 68.

The CPU 61 controls the entire diagnosis device 100. For example, the CPU 61 executes a program stored in the ROM 62 or the like by using the RAM 63 as a work area (workspace) to control the entire operation of the diagnosis device 100 and implement a diagnosis function.

The communication I/F 64 is an interface to communicate with an external apparatus, such as the processing machine 200. The sensor I/F 65 is an interface to receive the detection information from the sensor 57 mounted in the processing machine 200.

The input-output I/F 66 is an interface to connect various devices (for example, an input device 66*a* and a display 66*b*) and the bus 68.

The input device 66*a* is an input device, such as a mouse or a keyboard, to perform operations, such as input of a character, a numeral, or the like, selection of various instructions, and movement of a cursor.

The display 66*b* is a display device, such as a liquid crystal display (LCD), a plasma display, or an organic electro-luminescence (EL) display, to display a cursor, a menu, a window, and various kinds of information, such as a character or an image.

The auxiliary storage device 67 is a non-volatile storage device, such as a hard disk drive (HDD), a solid state drive (SSD), or an electrically erasable programmable read-only memory (EEPROM), to store various kinds of data, such as setting information on the diagnosis device 100, the detection information received from the processing machine 200, an operating system (OS), or an application program. While the auxiliary storage device 67 is included in the diagnosis device 100, the embodiment is not limited to this example. For example, the auxiliary storage device 67 may be a storage device provided outside the diagnosis device 100, or a storage device included in a server device that can perform data communication with the diagnosis device 100.

The hardware configuration illustrated in FIG. 3 is one example. In the case of the learning device 300, the sensor I/F 65 need not be included. Furthermore, for example, the input device 66*a* and the display 66*b* need not be included in the learning device 300 if they are not needed.

Functional Block Configuration and Operations of Diagnosis System

Figure 4:
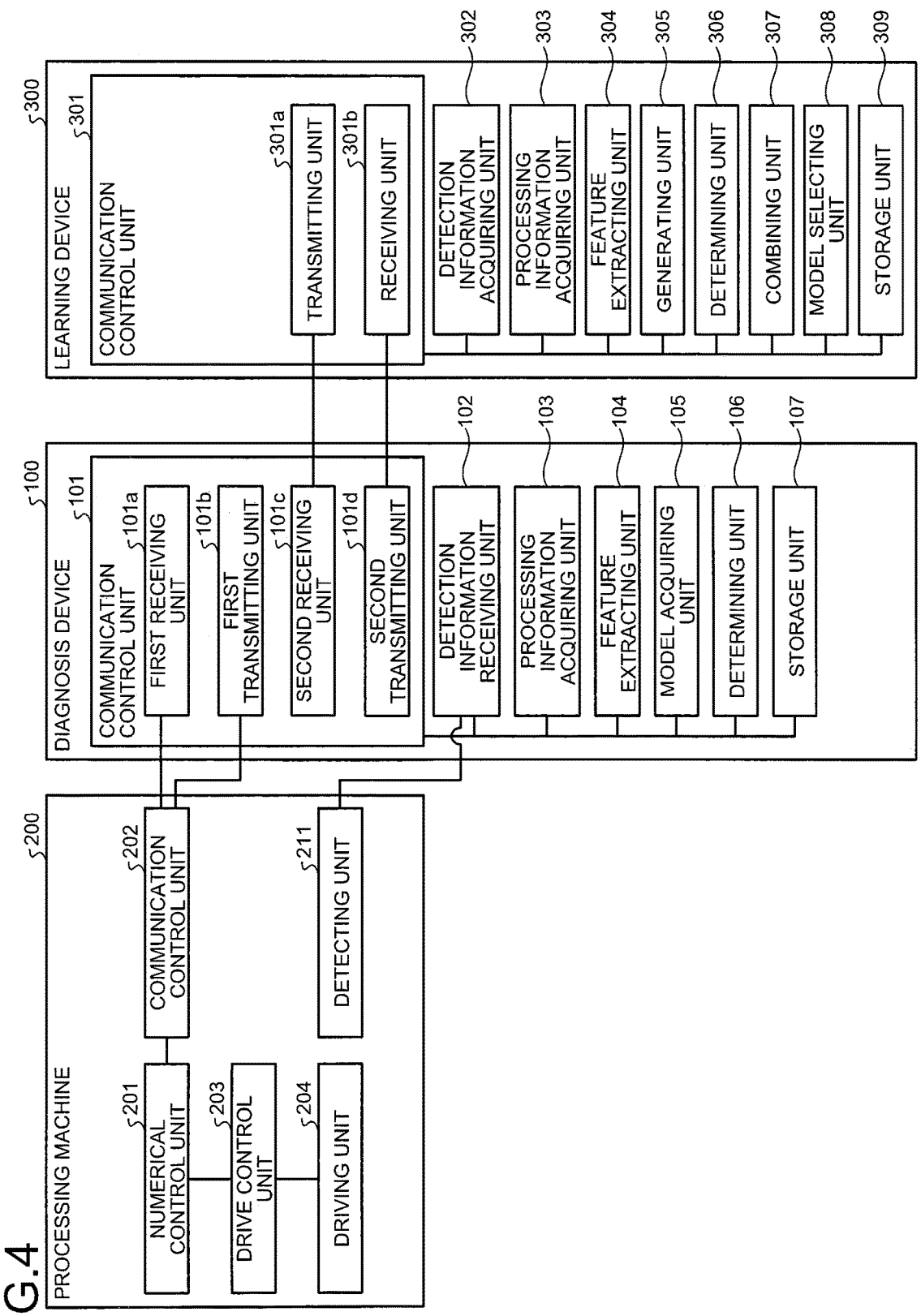
FIG. 4 is a schematic diagram illustrating an example of a functional block configuration of the diagnosis system according to the first embodiment.

FIG. 4 is a schematic diagram illustrating an example of a functional block configuration of the diagnosis system according to the first embodiment. With reference to FIG. 4, the functional block configuration and operations of the diagnosis system 1 and the processing machine 200 according to the first embodiment will be described.

As illustrated in FIG. 4, the processing machine 200 includes a numerical control unit 201, a communication control unit 202, a drive control unit 203, a driving unit 204, and a detecting unit 211.

The numerical control unit 201 is a functional unit that performs numerical control (NC) on processing performed by the driving unit 204. For example, the numerical control unit 201 generates and outputs numerical control data to control operations of the driving unit 204. Furthermore, the numerical control unit 201 outputs context information to the communication control unit 202. The context information includes pieces of information determined for respective kinds of operations performed by the processing machine 200. The context information includes, for example, identification information on the machine tool (the processing machine 200), identification information on the driving unit 204, an operating state of the driving unit 204, an accumulated use time of the driving unit 204 from a start of use, a load on the driving unit 204, and information indicating a processing condition (machining condition), such as a rotational frequency of the driving unit 204, a processing speed of the driving unit 204, a size of the driving unit 204, a diameter of a tool driven by the driving unit 204, and a material of the tool, and the like.

For example, the numerical control unit 201 transmits the context information indicating a current operation of the processing machine 200 to the diagnosis device 100 via the communication control unit 202. When a processing target is to be processed, the numerical control unit 201 changes a type of the driving unit 204 to be driven or a driving state (a rotational frequency, a rotational speed, or the like) of the driving unit 204 depending on a processing process (machining process). Every time changing the type of the operation, the numerical control unit 201 sequentially transmits the context information corresponding to the changed type of the operation to the diagnosis device 100 via the communication control unit 202. The numerical control unit 201 is implemented by, for example, a program executed by the CPU 51 illustrated in FIG. 2.

The communication control unit 202 is a functional unit that controls communication with an external apparatus, such as the diagnosis device 100. For example, the communication control unit 202 transmits the context information corresponding to a current operation to the diagnosis device 100. The communication control unit 202 is implemented by, for example, the communication I/F 54 and a program executed by the CPU 51 illustrated in FIG. 2.

The drive control unit 203 is a functional unit that controls drive of the driving unit 204 on the basis of the numerical control data obtained by the numerical control unit 201. The drive control unit 203 is implemented by, for example, the drive control circuit 55 illustrated in FIG. 2.

The driving unit 204 is a functional unit to be subjected to drive control performed by the drive control unit 203. The driving unit 204 drives a tool under the control of the drive control unit 203. The driving unit 204 is, for example, a motor or the like, or may be any device that is used for processing and that can be subjected to numerical control. It may be possible to provide two or more driving units 204. The driving unit 204 is an actuator, the drive of which is controlled by the drive control unit 203, and is implemented by, for example, the motor 56 illustrated in FIG. 2 or the like.

The detecting unit 211 is a functional unit that detects a physical quantity, such as vibrations or sounds, generated by a tool, such as a drill, an end mill, a bit tip, or a grinding stone, mounted in the processing machine 200, and outputs information on the detected physical quantity as the detection information (the sensor data) to the diagnosis device 100. The detecting unit 211 is implemented by the sensor 57 illustrated in FIG. 2. It may be possible to provide an arbitrary number of the detecting units 211. For example, it may be possible to provide a plurality of the detecting units 211 that detect the same physical quantity, or provide a plurality of the detecting units 211 that detect different physical quantities.

For example, if cracking of a blade used for processing, chipping of the blade, or the like occurs, sounds during processing change. Therefore, by causing the detecting unit 211 (the microphone) to detect acoustic data and comparing the acoustic data with a model indicating normal sounds or the like, it becomes possible to detect an abnormality in operations performed by the processing machine 200.

The numerical control unit 201 and the communication control unit 202 illustrated in FIG. 4 may be implemented by causing the CPU 51 illustrated in FIG. 2 to execute a program, that is, by software, may be implemented by hardware, such as an integrated circuit (IC), or may be implemented by a combination of software and hardware.

As illustrated in FIG. 4, the diagnosis device 100 includes a communication control unit 101, a detection information receiving unit 102 (a second acquiring unit), a processing information acquiring unit 103 (a first acquiring unit), a feature extracting unit 104, a model acquiring unit 105 (a third acquiring unit), a determining unit 106 (a first determining unit), and a storage unit 107.

The communication control unit 101 is a functional unit that controls communication with an external apparatus, such as the processing machine 200 and the learning device 300. The communication control unit 101 is implemented by, for example, the communication I/F 64 and a program executed by the CPU 61 illustrated in FIG. 3. The communication control unit 101 includes a first receiving unit 101*a*, a first transmitting unit 101*b*, a second receiving unit 101*c*, and a second transmitting unit 101*d*.

The first receiving unit 101*a* is a functional unit that receives the context information from the numerical control unit 201 of the processing machine 200 via the communication control unit 202. The first transmitting unit 101*b* is a functional unit that transmits various kinds of information to the processing machine 200. The second receiving unit 101*c* is a functional unit that receives various kinds of information (for example, a model used in the diagnosis process performed by the diagnosis device 100) from the learning device 300. The second transmitting unit 101*d* is a functional unit that transmits various kinds of information to the learning device 300.

The detection information receiving unit 102 is a functional unit that receives the detection information from the detecting unit 211 mounted in the processing machine 200. The detection information receiving unit 102 is implemented by, for example, the sensor I/F 65 and a program executed by the CPU 61 illustrated in FIG. 3.

The processing information acquiring unit 103 is a functional unit that receives, from the processing machine 200, the context information (processing information) received by the first receiving unit 101*a*. The processing information acquiring unit 103 is implemented by, for example, a program executed by the CPU 61 illustrated in FIG. 3.

The feature extracting unit 104 is a functional unit that extracts feature information used for determination performed by the determining unit 106 from the detection information. The feature information may be any kinds of information as long as the information indicates a feature of the detection information. For example, when the detection information is acoustic data collected by a microphone, the feature extracting unit 104 may extract, as the feature information, energy, a frequency spectrum, a Mel frequency cepstral coefficient (MFCC), or the like. The feature extracting unit 104 is implemented by, for example, a program executed by the CPU 61 illustrated in FIG. 3.

The model acquiring unit 105 is a functional unit that acquires a model used in a determination operation performed by the determining unit 106, from the learning device 300 via the second receiving unit 101*c*. Specifically, the model acquiring unit 105 transmits the context information acquired by the processing information acquiring unit 103 and a model acquisition request to the learning device 300 via the second transmitting unit 101*d*. Upon receiving the model acquisition request, the learning device 300 reads a model corresponding to the received context information from a storage unit 309, and transmits the model to the model acquiring unit 105 of the diagnosis device 100 via a transmitting unit 301*a* to be described later. The model acquiring unit 105 is implemented by, for example, a program executed by the CPU 61 illustrated in FIG. 3.

The determining unit 106 is a functional unit that determines whether an operation performed by the processing machine 200 is normal or not, by using the feature information extracted by the feature extracting unit 104 and by using the model that corresponds to the context information acquired by the processing information acquiring unit 103 and that is acquired by the model acquiring unit 105. For example, the determining unit 106 requests the feature extracting unit 104 to extract the feature information from the detection information. The determining unit 106 calculates a likelihood indicating the degree of likelihood that the feature information extracted from the detection information is normal, by using a corresponding model. The determining unit 106 compares the likelihood and a threshold determined in advance, and determines that the operation performed by the processing machine 200 is normal when the likelihood is equal to or greater than the threshold, for example. Furthermore, the determining unit 106 determines that the operation performed by the processing machine 200 is abnormal when the likelihood is smaller than the threshold. The determining unit 106 is implemented by, for example, a program executed by the CPU 61 illustrated in FIG. 3.

The storage unit 107 is a functional unit that stores various kinds of information needed for the diagnosis function of the diagnosis device 100. The storage unit 107 is implemented by, for example, the RAM 63, the auxiliary storage device 67, or the like in FIG. 3.

Each of the functional units (the communication control unit 101, the detection information receiving unit 102, the processing information acquiring unit 103, the feature extracting unit 104, the model acquiring unit 105, and the determining unit 106) of the diagnosis device 100 illustrated in FIG. 4 may be implemented by causing the CPU 61 illustrated in FIG. 3 to execute a program, that is, by software, may be implemented by hardware, such as an IC, or may be implemented by a combination of software and hardware.

As illustrated in FIG. 4, the learning device 300 includes a communication control unit 301, a detection information acquiring unit 302 (a fifth acquiring unit), a processing information acquiring unit 303 (a fourth acquiring unit), a feature extracting unit 304, a generating unit 305, a determining unit 306 (a second determining unit), a combining unit 307, a model selecting unit 308 (a selecting unit), and the storage unit 309.

The communication control unit 301 is a functional unit that controls communication with an external apparatus, such as the diagnosis device 100. The communication control unit 301 is implemented by, for example, the communication OF 64 and a program executed by the CPU 61 illustrated in FIG. 3. The communication control unit 301 includes the transmitting unit 301a and a receiving unit 301b.

The transmitting unit 301a is a functional unit that transmits various kinds of information (for example, a model used in the diagnosis process performed by the diagnosis device 100) to the diagnosis device 100. The receiving unit 301b is a functional unit that receives various kinds of information from the diagnosis device 100.

The detection information acquiring unit 302 is a functional unit that, when the generating unit 305 generates a model, acquires the detection information corresponding to the context information acquired by the processing information acquiring unit 303 from the diagnosis device 100 via the receiving unit 301b. The detection information acquiring unit 302 is implemented by, for example, a program executed by the CPU 61 illustrated in FIG. 3.

The processing information acquiring unit 303 is a functional unit that acquires the context information (the processing information) from the diagnosis device 100 via the receiving unit 301b. The processing information acquiring unit 303 is implemented by, for example, a program executed by the CPU 61 illustrated in FIG. 3.

The feature extracting unit 304 is a functional unit that extracts the feature information (a result of signal processing) used to generate a model by the generating unit 305, from the detection information acquired by the detection information acquiring unit 302. The feature extracting unit 304 is implemented by, for example, a program executed by the CPU 61 illustrated in FIG. 3.

The generating unit 305 is a functional unit that generates a model corresponding to the context information acquired by the processing information acquiring unit 303, from the feature information extracted by the feature extracting unit 304. The generating unit 305 associates the generated model with the context information and the feature information using, for example, a table as illustrated in FIG. 12 to be described later, and stores the model in the storage unit 309. The generating unit 305 is implemented by, for example, a program executed by the CPU 61 illustrated in FIG. 3.

The model is generated through, for example, learning using the detection information detected by the detecting unit 211 when the processing machine 200 operates normally. Any kinds of learning methods and any kinds of formats of a model to be learned may be applied. For example, a model, such as the Gaussian mixture model (GMM) or the hidden Markov model (HMM), and a corresponding model learning method may be applied.

The determining unit 306 is a functional unit that determines whether a plurality of pieces of the context information in the table illustrated in FIG. 12 to be described later are identical or similar to each other. The determining unit 306 is implemented by, for example, a program executed by the CPU 61 illustrated in FIG. 3.

The combining unit 307 is a functional unit that reads, from the storage unit 309, a plurality of models corresponding to the respective pieces of the identical or similar context information determined by the determining unit 306, and generates a new model by combining the read models. As a method of combining the models, a simple averaging process may be applied, or a weighted average may be obtained such that a smaller weight is given to a model generated on a later date to combine the models. By obtaining the weighted average such that a smaller weight is given to a model generated on a later date, it is possible to reduce an influence on a model generated on an earlier date, i.e., a model that has been used in the diagnosis process, and it is possible to improve the accuracy. The combining unit 307 is implemented by, for example, a program executed by the CPU 61 illustrated in FIG. 3. The combining unit 307 does not necessarily have to generate a new model by directly combining the plurality of models corresponding to the pieces of the identical or similar context information determined by the determining unit 306. For example, the combining unit 307 may generate a new model from a plurality of pieces of the feature information respectively corresponding to the pieces of the identical or similar context information determined as above.

The model selecting unit 308 is a functional unit that, in response to the model acquisition request received from the model acquiring unit 105 of the diagnosis device 100, selects and reads, from the storage unit 309, a model corresponding to the context information received together with the context information, and transmits the model to the model acquiring unit 105 of the diagnosis device 100 via the transmitting unit 301a. The model selecting unit 308 is implemented by, for example, a program executed by the CPU 61 illustrated in FIG. 3.

The storage unit 309 is a functional unit that stores therein various kinds of information, such as the feature information extracted from the feature extracting unit 304, the model generated by the generating unit 305, and the table in which the context information and the model are associated as illustrated in FIG. 12 to be described later. The storage unit 309 is implemented by, for example, the RAM 63, the auxiliary storage device 67, or the like in FIG. 3.

Each of the functional units (the communication control unit 301, the detection information acquiring unit 302, the processing information acquiring unit 303, the feature extracting unit 304, the generating unit 305, the determining unit 306, the combining unit 307, and the model selecting unit 308) of the learning device 300 illustrated in FIG. 4 may be implemented by causing the CPU 61 illustrated in FIG. 3 to execute a program, that is, by software, may be implemented by hardware, such as an IC, or may be implemented by a combination of software and hardware.

Furthermore, each of the functional units of the diagnosis device 100, the processing machine 200, and the learning device 300 illustrated in FIG. 4 are functionally conceptual, and do not necessarily have to be configured in the same manner. For example, a plurality of the functional units illustrated as independent functional units in FIG. 4 may be configured as a single functional unit. Alternatively, the function of a single functional unit in FIG. 4 may be divided into a plurality of functions as a plurality of functional units.

Diagnosis Process Performed by Diagnosis System

Figure 5:
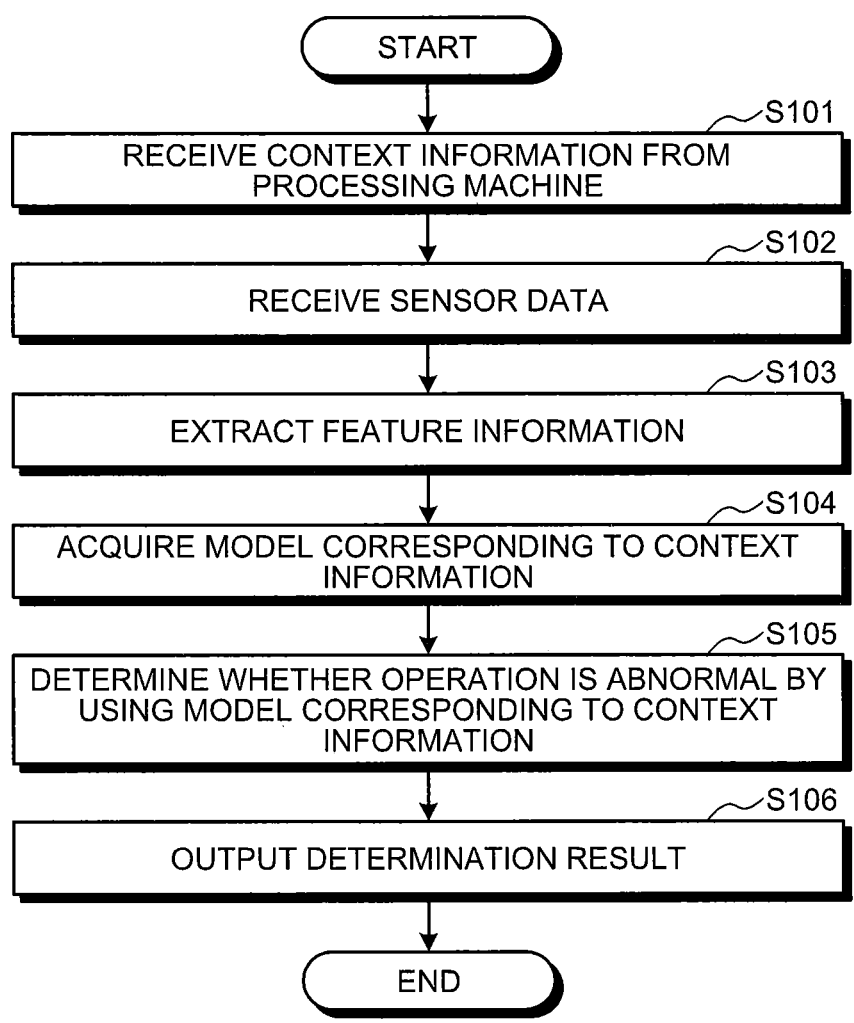
FIG. 5 is a flowchart illustrating an example of a diagnosis process in the first embodiment.

FIG. 5 is a flowchart illustrating an example of the diagnosis process in the first embodiment. With reference to FIG. 5, the diagnosis process performed by the diagnosis system 1 according to the first embodiment will be described.

As described above, the numerical control unit 201 of the processing machine 200 sequentially transmits the context information indicating a current operation of the processing machine 200 to the diagnosis device 100. The first receiving unit 101a receives the context information transmitted from the processing machine 200 as described above (Step S101). The processing information acquiring unit 103 acquires the context information received by the first receiving unit 101a.

The detecting unit 211 of the processing machine 200 sequentially outputs the detection information at the time of processing. The detection information receiving unit 102 receives the detection information (the sensor data) transmitted from the processing machine 200 as described above (Step S102).

The feature extracting unit 104 extracts the feature information from the received detection information (Step S103).

The model acquiring unit 105 transmits the context information acquired by the processing information acquiring unit 103 and the model acquisition request to the learning device 300 via the second transmitting unit 101d. The model selecting unit 308 of the learning device 300 selects and reads, from the storage unit 309, a model corresponding to the received context information in response to the received model acquisition request, and transmits the model to the model acquiring unit 105 of the diagnosis device 100 via the transmitting unit 301a. The model acquiring unit 105 acquires the model corresponding to the context information via the second receiving unit 101c (Step S104).

The determining unit 106 determines whether the processing machine 200 is operating normally, by using the extracted feature information and the model corresponding to the acquired context information (Step S105). The determining unit 106 outputs a determination result (Step S106). The determination result may be output by any methods. For example, the determining unit 106 may display the determination result on a display device (for example, the display 66b illustrated in FIG. 3) of the diagnosis device 100. Alternatively, the determining unit 106 may output the determination result to an external apparatus.

Model Generation Process Performed by Learning Device

Figure 6:
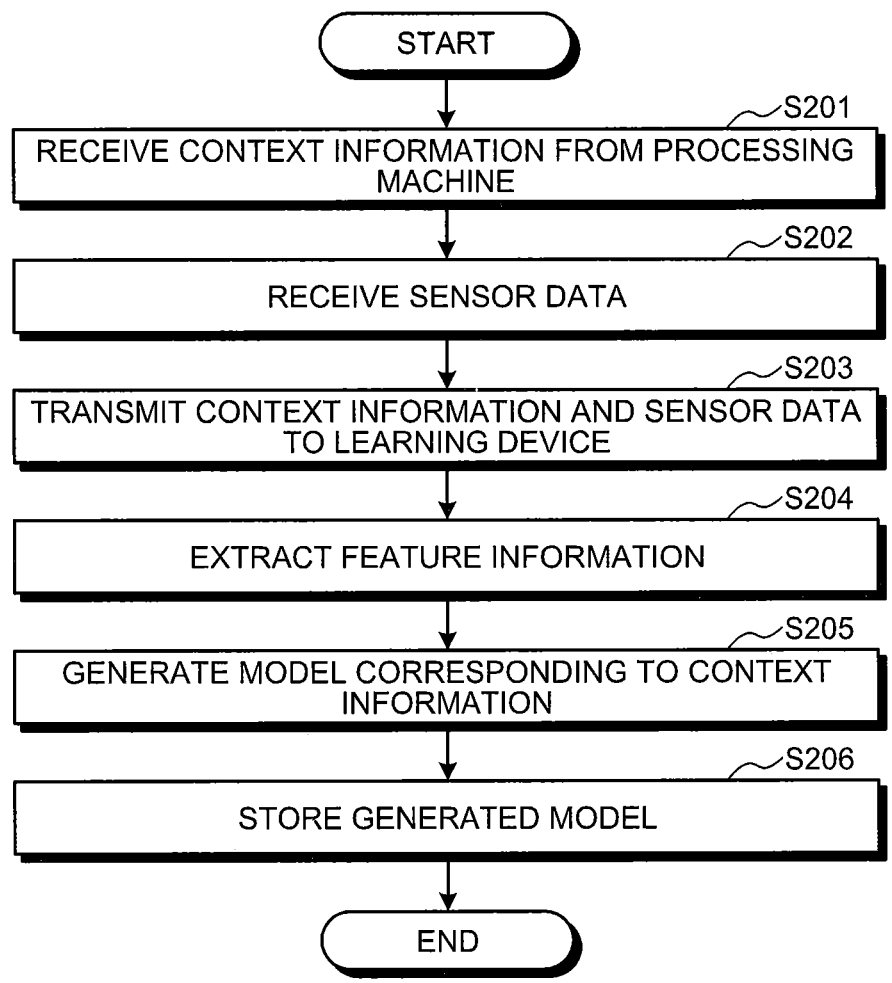
FIG. 6 is a flowchart illustrating an example of a model generation process in the first embodiment.

FIG. 6 is a flowchart illustrating an example of the model generation process in the first embodiment. With reference to FIG. 6, the model generation process performed by the learning device 300 according to the first embodiment will be described. The model generation process is performed in advance before the diagnosis process, for example. Alternatively, the model generation process may be performed when the context information for which a model has not been determined is input.

The first receiving unit 101a receives the context information transmitted from the processing machine 200 (Step S201). The processing information acquiring unit 103 acquires the context information received by the first receiving unit 101a.

The detection information receiving unit 102 receives the detection information (the sensor data) transmitted from the processing machine 200 (Step S202).

The context information and the detection information received as described above are used to generate a model. The model is generated for each context information; therefore, the detection information needs to be associated with corresponding context information. Therefore, for example, the detection information receiving unit 102 stores the received detection information in the storage unit 107 or the like in association with the context information that is received at the same timing by the first receiving unit 101a. It may be possible to temporarily store the context information and the detection information in the storage unit 107 or the like, confirm that the information is obtained during a normal operation, and generate a model by using only the information obtained during the normal operation. That is, it may be possible to generate a model by using the detection information labeled as normal.

Confirmation (labeling) as to whether information is obtained during a normal operation or not may be performed at an arbitrary timing after the information is stored in the storage unit 107 or the like, or may be performed in real time while the processing machine 200 is operating. It may be possible to generate a model by assuming that the information is normal, without performing labeling. If the information assumed as normal is in fact abnormal information, the determination process is not correctly performed because of the generated model. Such a situation can be discriminated based on the frequency that the information is determined as abnormal, and thus it is possible to take a countermeasure, such as deletion of a model generated by mistake. Furthermore, it may be possible to use a model generated from abnormal information as a model to determine an abnormality.

The processing information acquiring unit 103 (the first transmitting unit) transmits the acquired context information to the learning device 300 via the second transmitting unit 101d (Step S203). The detection information receiving unit 102 (the second transmitting unit) transmits the received detection information to the learning device 300 via the second transmitting unit 101d (Step S203). The processing information acquiring unit 303 of the learning device 300 acquires the context information transmitted from the diagnosis device 100 (the processing information acquiring unit 103) via the receiving unit 301b. The detection information acquiring unit 302 of the learning device 300 acquires the detection information transmitted from the diagnosis device 100 (the detection information receiving unit 102) via the receiving unit 301b.

The feature extracting unit 304 extracts the feature information from the detection information acquired by the detection information acquiring unit 302 (Step S204).

The generating unit 305 generates a model corresponding to the context information acquired by the processing information acquiring unit 303, from the feature information extracted by the feature extracting unit 304 (Step S205). The generating unit 305 associates the generated model with the context information and the feature information using, for example, the table as illustrated in FIG. 12 to be described later, and stores the model in the storage unit 309 (Step S206).

Detailed Examples of Model Generation Process and Diagnosis Process

Figure 7:
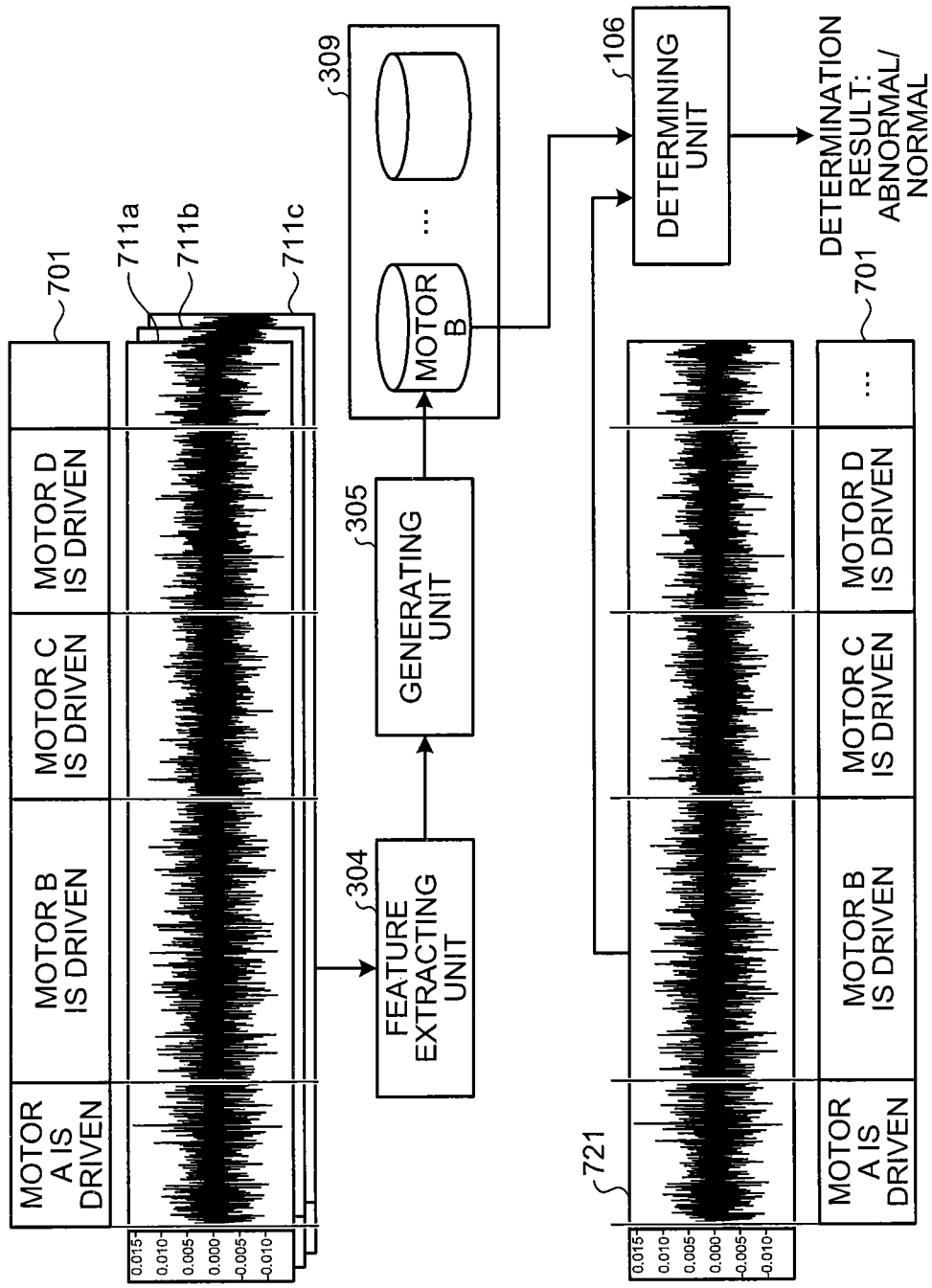
FIG. 7 is a schematic diagram for explaining a detailed example of the model generation process and the diagnosis process in the first embodiment.

Detailed examples of the model generation process and the diagnosis process according to the first embodiment will be described below. FIG. 7 is a schematic diagram for explaining a detailed example of the model generation process and the diagnosis process in the first embodiment.

FIG. 7 illustrates the model generation process and the diagnosis process on a part of a process of processing a certain component, for example. In the model generation process, a plurality of detection information string (a plurality of detection information strings 711a to 711c in FIG. 7) that are received together with a context information string 701 are used. The number of the detection information strings is not limited to three, and an arbitrary number of detection information strings may be used.

The context information string 701 indicates that a processing process includes operations of driving four motors (a motor A, a motor B, a motor C, and a motor D). The feature extracting unit 304 extracts a piece of feature information from a piece of detection information acquired by the detection information acquiring unit 302. The generating unit 305 generates, for each piece of context information corresponding to each of the motors, a model by using the piece of the feature information extracted from the piece of the corresponding detection information. The generated model is associated with the corresponding context information as indicated by the table in FIG. 12 to be described later, and stored in the storage unit 309 or the like. In FIG. 7, an example is illustrated in which a model ("motor B") generated for a piece of the context information obtained when the motor B is driven is stored in the storage unit 309. The stored model is referred to in the subsequent diagnosis process.

In the diagnosis process, similarly to the model generation process, a detection information string 721 is received together with the context information string 701. When a piece of the context information indicates that the "motor B is driven", the determining unit 106 determines whether the operation performed by the processing machine 200 is normal by using, for example, a piece of the detection information received during a period in which the piece of the context information is received, and by using the model "motor B" that is acquired by the model acquiring unit 105 and stored in the storage unit 309.

When other pieces of the context information are received, the determining unit 106 similarly performs the determination by using pieces of corresponding detection information and corresponding models.

Figure 8:
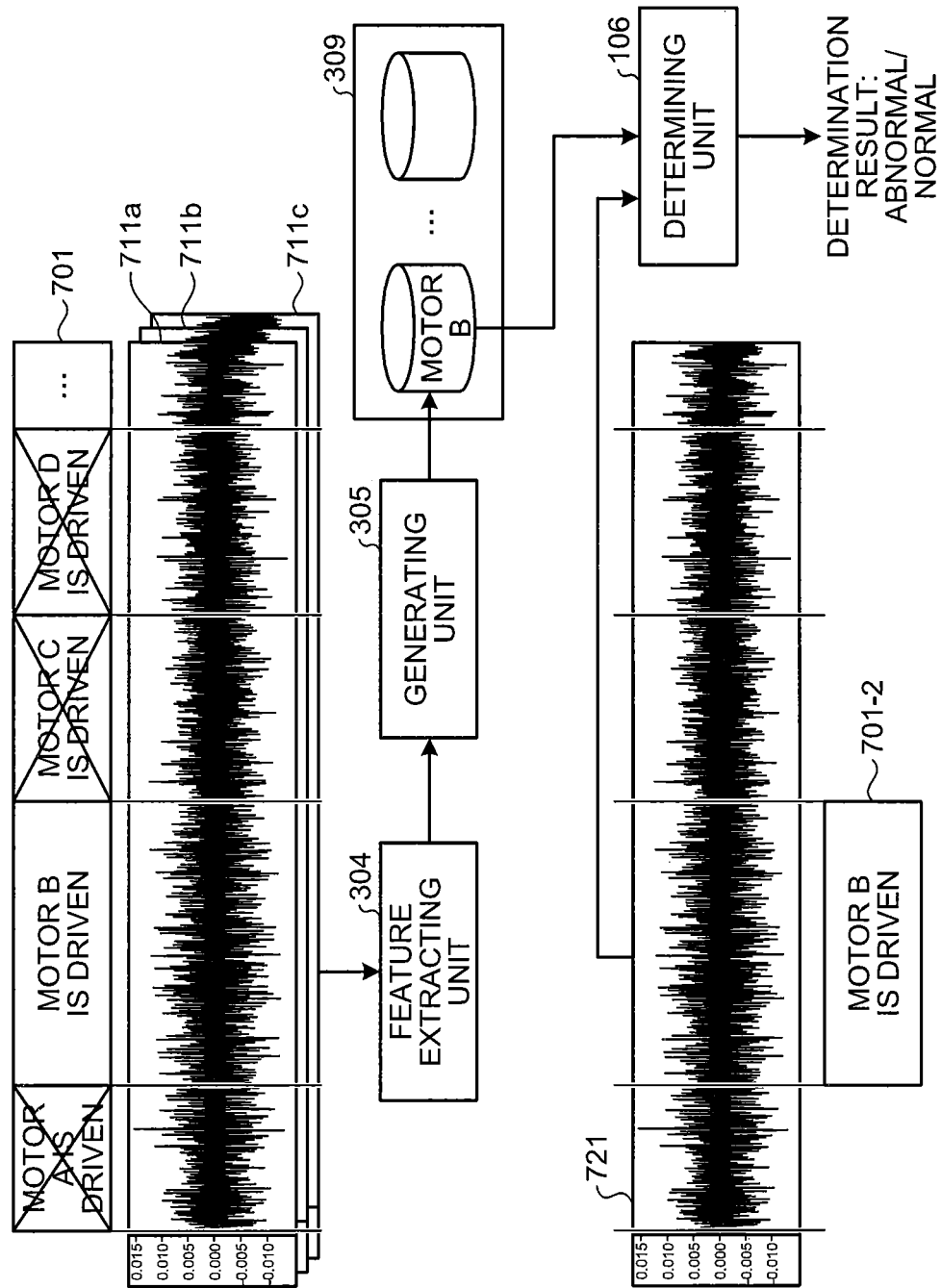
FIG. 8 is a schematic diagram for explaining a detailed example for performing the model generation process and the diagnosis process on a certain piece of context information.

It is not necessary to perform determination on all pieces of the context information. FIG. 8 is a schematic diagram for explaining a detailed example of the model generation process and the diagnosis process performed on a certain piece of the context information.

In the example in FIG. 8, a model is generated only when a piece of the context information indicates that the "motor B is driven". Furthermore, the diagnosis process is performed when a piece of context information 701-2 indicating that the "motor B is driven" is received. With this process, it is possible to perform the diagnosis process by using only a piece of the detection information that is effective to determine an abnormality. For example, when acoustic data is used as the detection information, in some cases, a processing process may include an interval, such as a silent interval, for which determination is not needed. By excluding the above-described unnecessary interval from a determination target, it becomes possible to reduce false determination and calculation costs. That is, it becomes possible to increase the accuracy and the efficiency of the diagnosis process.

Figure 9:
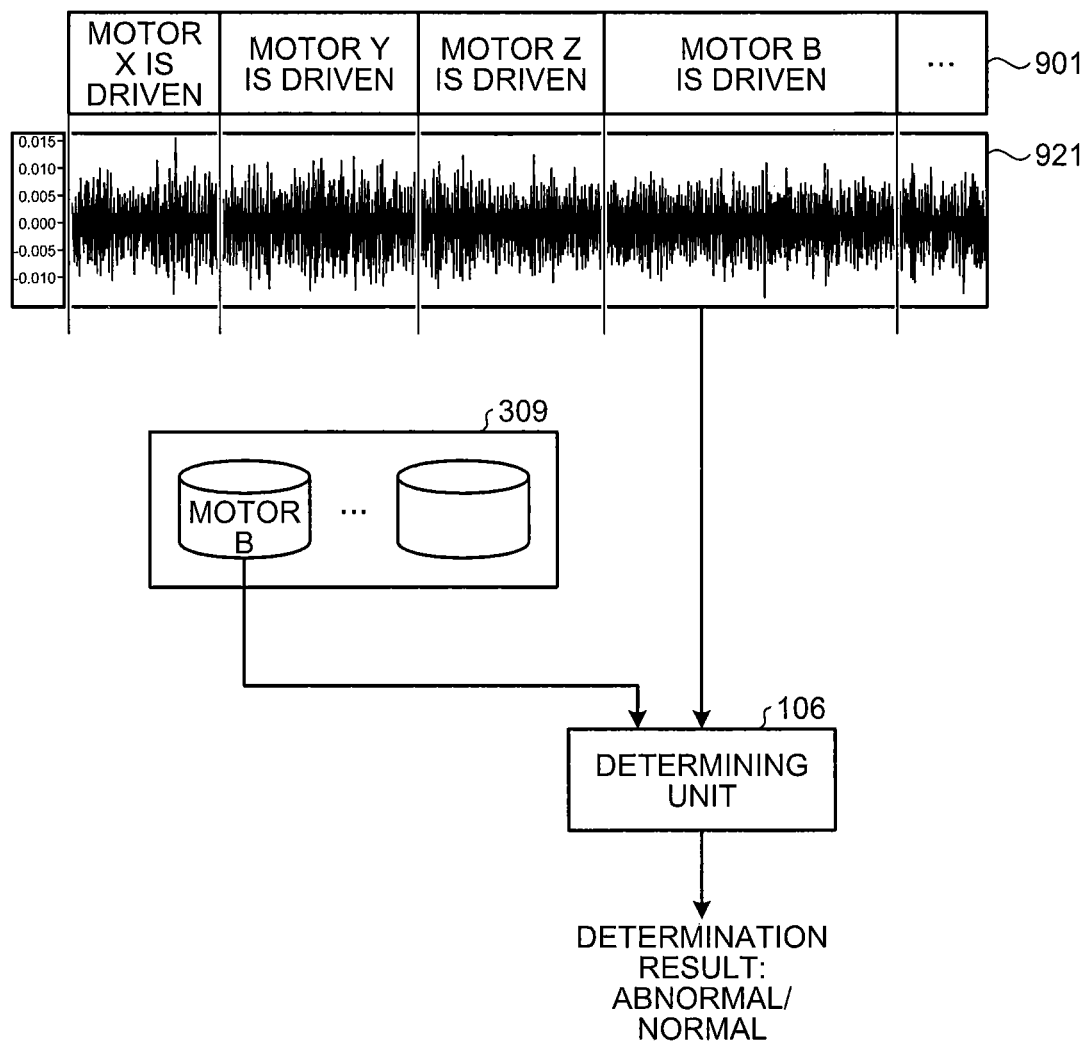
FIG. 9 is a schematic diagram for explaining an example in which a common model is used in different processing processes.

Furthermore, even in different processing processes, if the same motor or the like is used for example, it may be possible to perform the diagnosis processes by sharing a corresponding model. FIG. 9 is a schematic diagram for explaining an example in which a common model is used in different processing processes.

A context information string 901 in FIG. 9 indicates that a processing process includes operations of driving four motors (a motor X, a motor Y, a motor Z, and the motor B). The motor B is used in this processing process in common with the processing process illustrated in FIG. 7, for example. Therefore, even in the processing process in FIG. 9, the determining unit 106 can perform the diagnosis process by using the same model "motor B" stored in the storage unit 309 of the learning device 300 and a detection information string 921.

Figure 10:
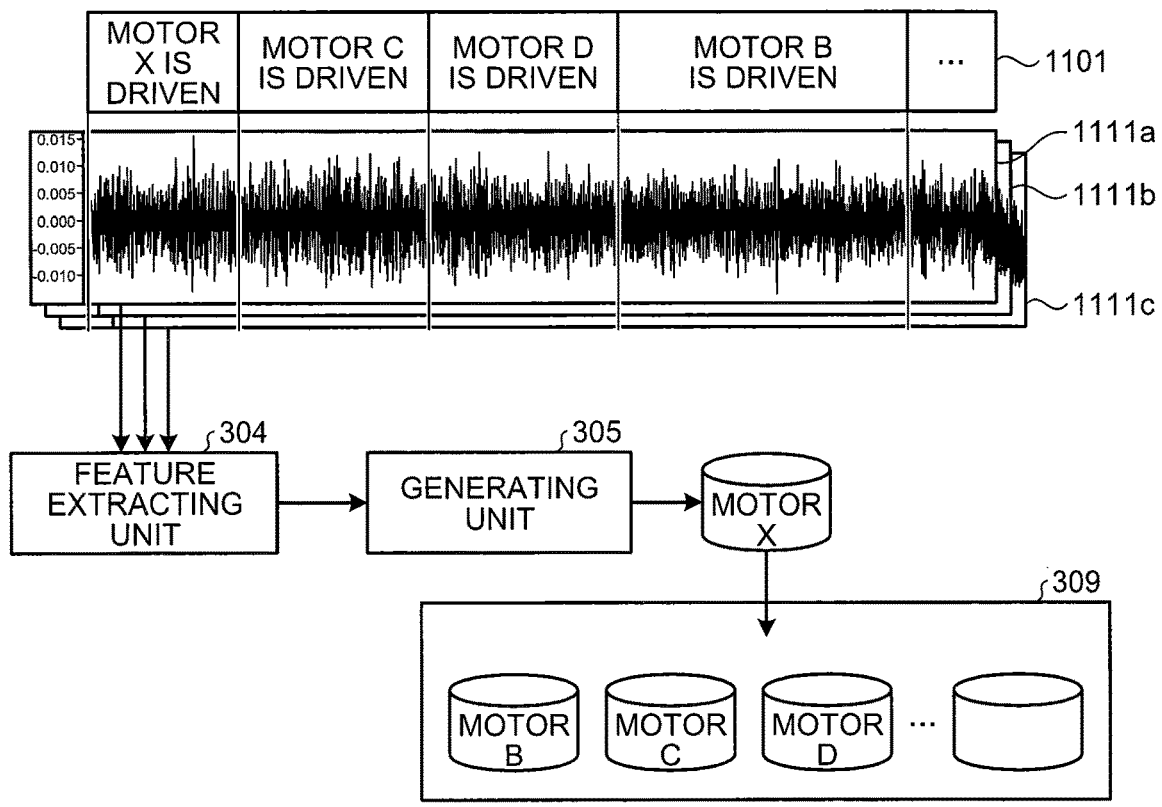
FIG. 10 is a schematic diagram for explaining an operation of generating a model when context information for which a model has not been generated is input.

FIG. 10 is a schematic diagram for explaining an operation of generating a model when a piece of context information for which a model has not been generated is input. A context information string 1101 in FIG. 10 indicates that a processing process includes operations of driving four motors (the motor X, the motor C, the motor D, and the motor B). It is assumed that a model for a piece of context information indicating drive of the motor X has not been generated.

In this case, the feature extracting unit 304 extracts, for each of a plurality of detection information strings (each of detection information strings 1111a, 1111b, and 1111c in FIG. 10), a piece of feature information from a piece of detection information in a period corresponding to the piece of context information indicating that "the motor X is driven". The generating unit 305 generates a model "motor X" corresponding to the piece of the context information indicating that "the motor X is driven" by using the pieces of the extracted feature information, and stores the model in the storage unit 309. With this operation, it becomes possible to determine an abnormality in subsequent periods in which the motor X is driven.

As described above, the context information indicating a current operation is received from the processing machine 200, and an abnormality is determined by using a model corresponding to the received context information. Therefore, it is possible to identify a currently-operating driving unit with high accuracy and diagnose an abnormality with high accuracy.

Model Combination Process by Learning Device

Figure 11:
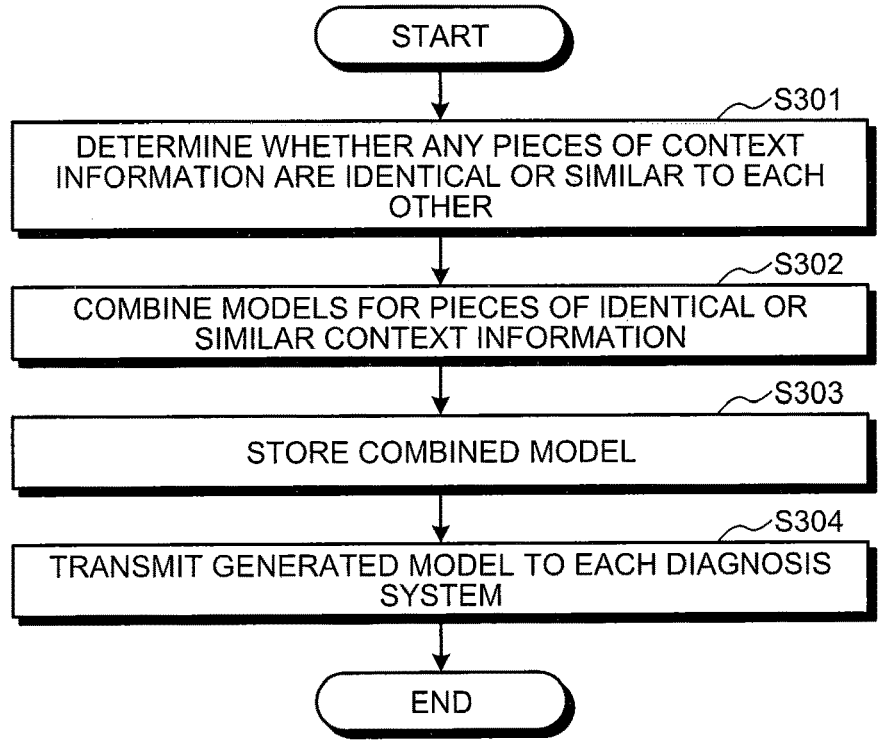
FIG. 11 is a flowchart illustrating an example of a model combination process in the first embodiment.

FIG. 11 is a flowchart illustrating an example of the model combination process in the first embodiment. FIG. 12 is a schematic diagram illustrating an example of the table for associating the context information and the model. With reference to FIG. 11 and FIG. 12, the model combination process performed by the learning device 300 according to the first embodiment will be described.

As illustrated in FIG. 12, the table in which the model generated by the generating unit 305, the feature information, and the context information are associated is stored in the storage unit 309. In the table illustrated in FIG. 12, a "machine tool No.", "processing device identification information", a "processing condition", "feature information", and a "generated model" are associated with each other. The "machine tool No." is, for example, a number uniquely indicating a plurality of machine tools, such as the processing machines 200_1, 200_2, . . . illustrated in FIG. 1. The "processing device identification information" is information for identifying a processing device, such as a numerical control machine (NC machine), mounted in the machine tool. For example, the "processing device identification information" may be a model or the like of the processing device, such as an NC machine. The "processing condition" indicates an operating condition applied when the machine tool, such as the processing machine 200, performs a processing operation. In the example illustrated in FIG. 12, the "processing condition" includes a "motor rotational speed", a "drill diameter", a "drill material", and a "processing speed". The "feature information" is information indicating, for example, a path in which the feature information extracted by the feature extracting unit 304 is stored in the storage unit 309. The "generated model" is information indicating, for example, a path in which the model generated by the generating unit 305 is stored in the storage unit 309. Among the pieces of the information associated with each other in the table illustrated in FIG. 12, for example, the "machine tool No.", the "processing device identification information", and the "processing condition" are assumed as pieces of information included in the context information acquired by the processing information acquiring unit 303.

Step S301

The determining unit 306 refers to the table stored in the storage unit 309, which is illustrated in FIG. 12, and determines whether any pieces of the context information are identical or similar to each other. For example, in the table illustrated in FIG. 12, the machine tools (the processing machines 200) with the "machine tool No." of "1", "4", and "5" are separate machines but have the same "processing condition" such as the "motor rotational speed" of "8000", the "drill diameter" of "Φ3.0", the "drill material" of "cemented carbide", and the "processing speed" of "1250"; therefore, the determining unit 306 determines that these pieces of the context information are similar to each other. Then, the process proceeds to Step S302.

Step S302

The combining unit 307 reads, from the storage unit 309, a model corresponding to each of the pieces of the context information determined to be identical or similar to each other (referred to as "the identical or similar content information") by the determining unit 306, and generates a new model by combining the read models. For example, in the example illustrated in FIG. 12, the determining unit 306 determines that the pieces of the context information including the "machine tool No." of "1", "4", and "5" are similar to each other, and therefore, the combining unit 307 reads and combines models "No1_model", "No4_model", and "No5_model" corresponding to the respective pieces of the context information from the storage unit 309. Then, the process proceeds to Step S303.

Step S303

The combining unit 307 stores the new combined model in the storage unit 309. For example, the combining unit 307 stores the new model in the storage unit 309 in association with the pieces of the context information including the "machine tool No." of "1", "4", and "5" illustrated in FIG. 12. Specifically, the combining unit 307 updates the "generated model" of "No1_model", "No4_model", and "No5_model" corresponding to the pieces of the context information including the "machine tool No." of "1", "4", and "5" illustrated in FIG. 12 with "New_model" indicating a path of the new model, for example. Then, the process proceeds to Step S304.

Step S304

Upon receiving the model acquisition request from the model acquiring unit 105 of the diagnosis device 100 in the diagnosis system 1, the model selecting unit 308 selects and reads, from the storage unit 309, a model corresponding to the context information that is received together with the model acquisition request, and transmits the model to the model acquiring unit 105 of the diagnosis device 100 via the transmitting unit 301a. For example, when the received context information matches the context information including the "machine tool No." of "4" illustrated in FIG. 12, the model selecting unit 308 transmits the new model represented by "New_model" as the corresponding "generated model" to the model acquiring unit 105.

The model combination process is performed at Steps S301 to S303 as described above, and a corresponding model is transmitted to the diagnosis device 100 in response to a request from the diagnosis device 100 at Step S304.

As described above, when any pieces of the context information are identical or similar to each other (for example, the "machine tool No." is different but the "processing condition" is identical), the learning device 300, which generates models from the pieces of the detection information corresponding to the pieces of the context information and stores the generated models, generates a new model by combining models corresponding to the pieces of the identical or similar context information. In general, when a model is generated, the accuracy of the model for determining an abnormality is improved with an increase in the number of pieces of learning data (the detection information). Therefore, by combining the models corresponding to the pieces of the identical or similar context information as described above, it becomes possible to obtain a highly accurate model.

While the learning device 300 generates a model in the above-described first embodiment, the embodiment is not limited to this example. The diagnosis device 100 may be provided with a generating unit that generates a model, and the learning device 300 may be provided with a function to store models, combine models, and transmit a model corresponding to the received context information to the diagnosis device 100.

Modification 1-1 of First Embodiment

In the first embodiment, an example has been described in which it is determined that pieces of the context information are similar to each other when, for example, the "machine tool No." and the "processing device identification information" are different but the "processing condition" is identical as a condition for determining that the pieces of the context information are identical or similar in order to combine models. In a modification 1-1, types of the condition for determining that the pieces of the context information are identical or similar will be described.

For example, even if the "machine tool No." is different, when the "processing device identification information" and the "processing condition" are identical, the determining unit 306 may determine that the pieces of the context information are similar to each other. For example, in the table illustrated in FIG. 12, the machine tools (the processing machines 200) with the "machine tool No." of "1" and "5" are separate machines but have the same "processing device identification information" of "TypeA" and the same "processing condition"; therefore, the determining unit 306 may determine that these pieces of the context information are similar to each other. With this operation, as compared to the determination method as to whether pieces of information are identical or similar in the first embodiment as described above, whether the "processing device identification information" is identical or not is additionally used as a similarity factor; therefore, it is possible to obtain a more accurate model.

Furthermore, the determining unit 306 may set a threshold for determining the similarity of pieces of the context information, and if at least any of values in the "processing condition" is in a predetermined range defined by the threshold, the determining unit 306 may determine that the pieces of the context information are similar to each other. In an actual processing operation, with respect to the "motor rotational speed" and the "processing speed" for example, a load slightly changes depending on a material to be processed. For example, even if the "motor rotational speed" is set to 8000, an error of a few percent may occur in actuality. Therefore, in the determination performed by the determining unit 306 as to whether pieces of information are identical or similar, a certain difference in the value of the "processing condition" is allowed in order not to depend on the state of a processing operation of the machine tool at that moment. For example, if the allowable range of the above-described "motor rotational speed" is set to ±1 [%], the predetermined range is 7920 to 8080; therefore, it is determined that pieces of the context information with values in the predetermined range are similar to each other.

Meanwhile, if all of the values in the "processing condition" are in the predetermined range defined by the threshold, or if any of the values in the "processing condition" is in the predetermined range and the other values in the "processing condition" are identical, the determining unit 306 may determine that the pieces of the context information are similar to each other. Furthermore, even when any of the values in the "processing condition" is not identical, if a specific value in the "processing condition" (for example, the "motor rotational speed", the "processing speed", or the like illustrated in FIG. 12) that has a large influence on the state of a processing operation is in the predetermined range, the determining unit 306 may determine that the pieces of the context information are similar to each other.

With the determination method using the threshold as described above, pieces of the context information including values for which an error is likely to occur in the "processing condition" can be determined as similar information. Therefore, by combining models corresponding to the pieces of the similar context information, it is possible to obtain a more accurate model.

Furthermore, the determining unit 306 may determine that pieces of the context information are similar to each other when a predetermined number of values or more values in the "processing condition" are identical. For example, in the table illustrated in FIG. 12, the determining unit 306 may determine that pieces of the context information are similar to each other when the "drill diameter" and the "motor rotational speed" in the "processing condition" are identical. As in the determination method as described above, by determining whether a value having a large influence on the state of a processing operation in the "processing condition" is identical or not, and by combining models corresponding to the pieces of the similar context information, it is possible to obtain a more accurate model.

Moreover, the determining unit 306 may determine that pieces of the context information are similar to each other when the "processing device identification information" is identical. For example, in the table illustrated in FIG. 12, among the pieces of the context information including the "machine tool No." of "1", "4" and "5", the "processing device identification information" associated with "1" and "5" is identical but the "processing device identification information" associated with "1" and "4" is different; in this case, the determining unit 306 may determine that the pieces of the context information including the "machine tool No." of "1" and "5" are similar to each other. With the determination method as described above, by estimating that similar feature information can be obtained when the "processing device identification information" is identical, and by combining models corresponding to the pieces of the similar context information, it is possible to obtain a more accurate model. This determination method is an example of a method in which the "processing condition" is not used as a similarity factor for the context information.

Furthermore, the determining unit 306 may determine that pieces of the context information are similar to each other when pieces of the feature information corresponding to the pieces of the context information are similar to each other. That is, even when pieces of the detection information are acquired in different locations, if corresponding pieces of the feature information are similar to each other, it is possible to estimate that motor sounds are similar to each other. This determination method is an example in which the "processing condition" is not used as a similarity factor for the context information.

Moreover, the determining unit 306 may determine that pieces of the context information are similar to each other when the "processing device identification information" of the pieces of the context information is identical and corresponding pieces of the feature information are similar to each other. This determination method is an example in which the "processing condition" is not used as a similarity factor for the context information.

With the above-described types of the determination methods, it is possible to determine whether pieces of the context information are similar to each other. If the determining unit 306 determines that the pieces of the context information are identical or similar to each other through the determination method as described above, the combining unit 307 reads models corresponding to the pieces of the identical or similar context information from the storage unit 309 and generates a new model by combining the read models as described in the first embodiment.

Modification 1-2 of First Embodiment

In the first embodiment, an operation has been described in which the context information and the detection information acquired from the processing machine 200 are transmitted to the learning device 300 every time the context information and the detection information are acquired. In a modification 1-2, an operation will be described in which only the context information is first transmitted to the learning device 300, and the learning device 300 determines whether it is necessary to acquire the corresponding detection information on the basis of the received context information.

Operation of Transmitting Detection Information by Diagnosis Device

FIG. 13 is a flowchart illustrating an example of an operation of transmitting sensor data that is determined as necessary by a learning device according to the modification 1-2 of the first embodiment. With reference to FIG. 13, the operation of transmitting the detection information by the diagnosis device 100 according to the modification 1-2 will be described.

Step S401

The first receiving unit 101a of the diagnosis device 100 receives the context information transmitted from the processing machine 200. The processing information acquiring unit 103 of the diagnosis device 100 acquires the context information received by the first receiving unit 101a. Then, the process proceeds to Step S402.

Step S402

The detection information receiving unit 102 of the diagnosis device 100 receives the detection information (the sensor data) transmitted from the processing machine 200. Then, the process proceeds to Step S403.

Step S403

The processing information acquiring unit 103 (the first transmitting unit) transmits the acquired context information to the learning device 300 via the second transmitting unit 101d. The processing information acquiring unit 303 of the learning device 300 acquires the context information transmitted from the diagnosis device 100 (the processing information acquiring unit 103) via the receiving unit 301b. Then, the process proceeds to Step S404.

Step S404

The determining unit 306 of the learning device 300 determines whether it is necessary to acquire the detection information corresponding to the context information acquired by the processing information acquiring unit 303 and to generate or combine a model, on the basis of the context information acquired by the processing information acquiring unit 303 and the context information stored in the storage unit 309 (for example, the context information (the "machine tool No.", the "processing device identification information", and the "processing condition") associated with the feature information and the model in the table illustrated in FIG. 12).

Specifically, for example, the determining unit 306 determines whether a model corresponding to the context information acquired by the processing information acquiring unit 303 is already generated and stored in the storage unit 309. Furthermore, for example, the determining unit 306 determines whether it is necessary to combine a model with a model corresponding to context information that is identical or similar to the context information acquired by the processing information acquiring unit 303. As a criterion to determine whether it is necessary to generate or combine a model by the determining unit 306, for example, it is determined whether the processing condition included in the context information acquired by the processing information acquiring unit 303 is a processing condition widely used in a society. If the processing condition is not widely used, the learning device 300 need not receive the detection information corresponding to the context information and need not generate a model. If the processing condition is widely used, the learning device 300 receives the detection information corresponding to the context information and combines a model with a model corresponding to the identical or similar context information, so that it is possible to improve the accuracy of the model. Then, the process proceeds to Step S405.

Step S405

Upon determining that it is necessary to generate or combine a model, the determining unit 306 requests the diagnosis device 100 to transmit the detection information corresponding to the context information acquired by the processing information acquiring unit 303. Then, the process proceeds to Step S406.

Step S406

The detection information receiving unit 102 (the second transmitting unit) transmits the received detection information to the learning device 300 via the second transmitting unit 101d. The detection information acquiring unit 302 of the learning device 300 acquires the detection information transmitted from the diagnosis device 100 (the detection information receiving unit 102) via the receiving unit 301b.

Through the operations at Steps S401 to S406 as described above, the diagnosis device 100 according to the modification 1-2 performs the operation of transmitting the detection information. The subsequent operations of generating and combining a model are the same as the operations described in the first embodiment with reference to FIG. 6 and FIG. 11.

As described above, in the modification 1-2, only the context information is first transmitted to the learning device 300. The learning device 300 determines whether it is necessary to acquire the corresponding detection information on the basis of the received context information, receives the detection information only when it is needed, and then generates or combines a model. With this operation, when the learning device 300 need not acquire the detection information, the diagnosis device 100 need not transmit the detection information to the learning device 300 via the network 2, so that it is possible to reduce an unnecessary traffic between the diagnosis device 100 and the learning device 300.

Second Embodiment

With respect to a diagnosis system according to a second embodiment, a difference from the diagnosis system 1 of the first embodiment will be mainly described. In the first embodiment, an operation has been described in which when the diagnosis device 100 transmits the context information and the detection information to the learning device 300 via the network 2, the context information and the detection information are transmitted as they are. However, in some cases, the context information or the detection information transmitted to the learning device 300 may include information that a customer, such as a manufacturer, of the processing machine 200 want to conceal. In the second embodiment, an operation will be described in which when the diagnosis device 100 transmits the context information and the detection information to the learning device 300 via the network 2, the context information and the detection information are encrypted and then transmitted. The entire configuration of the diagnosis system and the hardware configurations of a processing machine, a diagnosis device, and a learning device in the second embodiment are the same as those described in the first embodiment.

Functional Block Configuration and Operation of Diagnosis System

Figure 14:
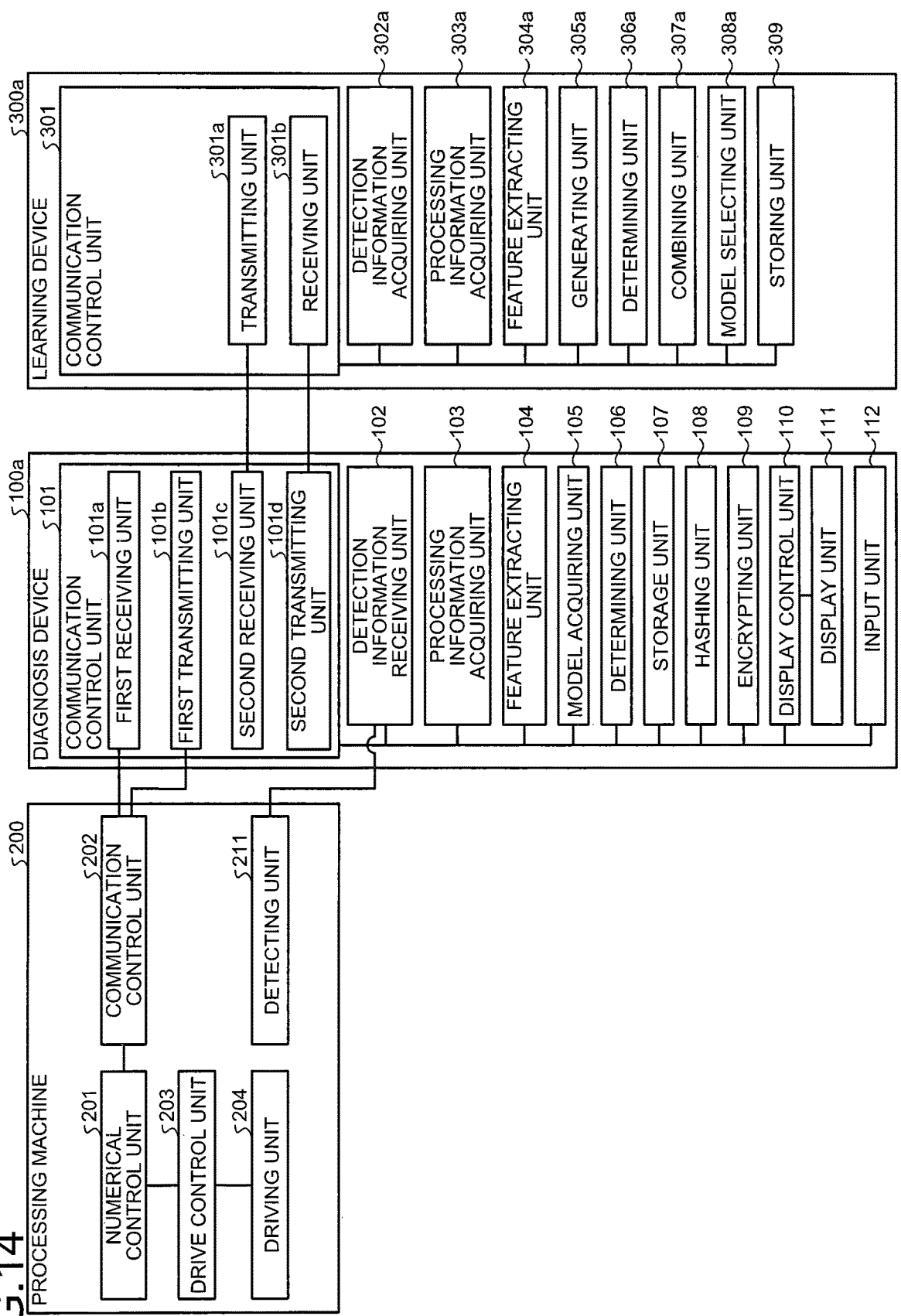
FIG. 14 is a schematic diagram illustrating an example of a functional block configuration of a diagnosis system according to a second embodiment.
Figure 15:
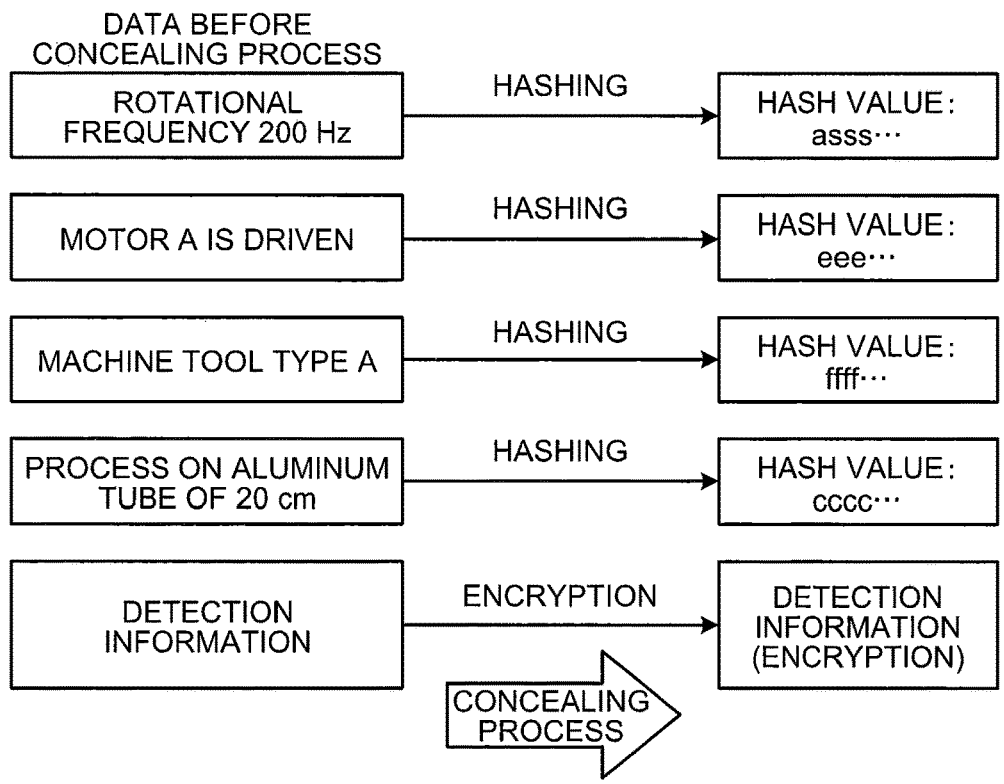
FIG. 15 is a schematic diagram for explaining an example of encryption in the second embodiment.
Figure 16:
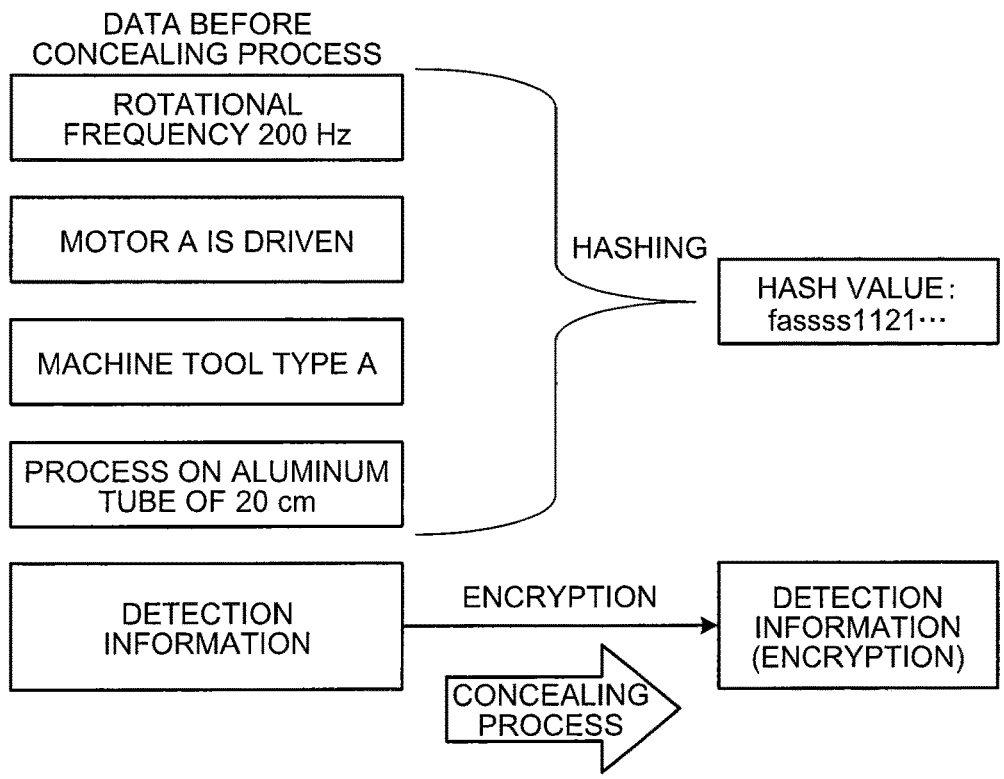
FIG. 16 is a schematic diagram for explaining another example of encryption in the second embodiment.
Figure 17:
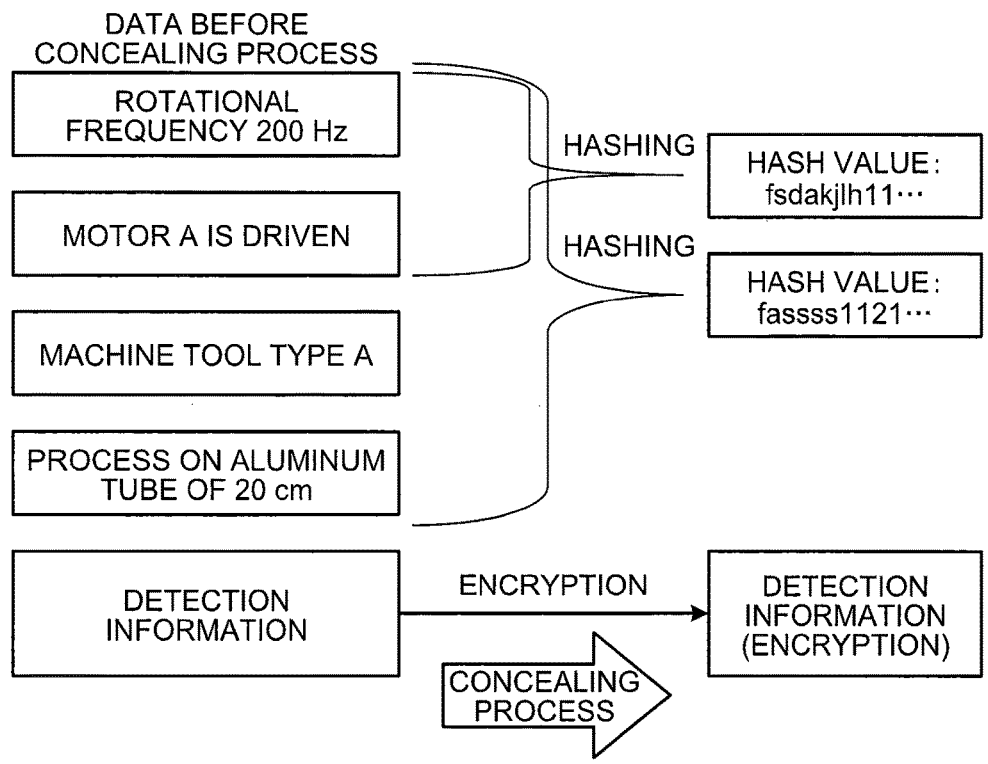
FIG. 17 is a schematic diagram for explaining a still another example of encryption in the second embodiment.
Figure 18:
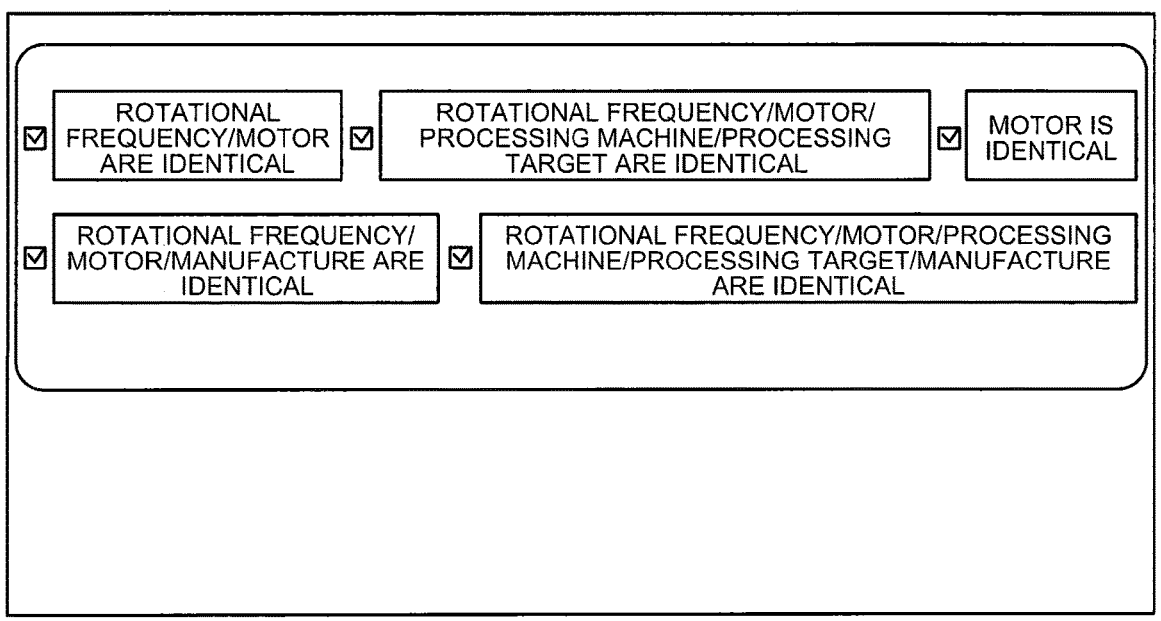
FIG. 18 is a schematic diagram illustrating an example of a screen for setting a combination of elements of context information.

FIG. 14 is a schematic diagram illustrating an example of a functional block configuration of the diagnosis system according to the second embodiment. FIG. 15 is a schematic diagram for explaining an example of encryption in the second embodiment. FIG. 16 is a schematic diagram for explaining another example of encryption in the second embodiment. FIG. 17 is a schematic diagram for explaining a still another example of encryption in the second embodiment. FIG. 18 is a schematic diagram illustrating an example of a screen for setting a combination of elements of context information. With reference to FIG. 14 to FIG. 18, the functional block configuration and operations of the diagnosis system and the processing machine 200 according to the second embodiment will be described. The functional block configuration and the operations of the processing machine 200 are the same as the configuration and the operations described in the first embodiment.

As illustrated in FIG. 14, a diagnosis device 100a includes the communication control unit 101, the detection information receiving unit 102 (the second acquiring unit), the processing information acquiring unit 103 (the first acquiring unit), the feature extracting unit 104, the model acquiring unit 105 (the third acquiring unit), the determining unit 106 (the first determining unit), the storage unit 107, a hashing unit 108, an encrypting unit 109, a display control unit 110, a display unit 111, and an input unit 112. Operations performed by the communication control unit 101, the detection information receiving unit 102, the processing information acquiring unit 103, and the storage unit 107 are the same as the operations described in the first embodiment.

The hashing unit 108 is a functional unit that performs hashing to obtain a hash value by applying a hash function to the context information acquired by the processing information acquiring unit 103. The hashing is an irreversible encryption process and is an example of a data concealing process.

For example, as illustrated in FIG. 15, the hashing unit 108 may perform hashing on each of elements of the context information (a "rotational frequency 200 Hz", the "motor A is driven", a "machine tool Type A", and a "process on aluminum tube of 20 cm") and obtain hash values. In this case, it becomes possible to categorize each of the hash values of the elements, and associate the categories with the detection information. Alternatively, as illustrated in FIG. 16, the hashing unit 108 may collectively perform hashing on pieces of the context information and obtain a single hash value. Still alternatively, as illustrated in FIG. 17, the hashing unit 108 may perform hashing for each of specific combinations of the elements of the context information and obtain hash values. In this case, it becomes possible to categorize each of the combinations of the elements of the context information that may be used, and associate the categories with the detection information.

It may also be possible to allow an administrator to set a specific combination of elements of the context information as illustrated in FIG. 17 described above by using a setting screen as illustrated in FIG. 18. For example, the display control unit 110 to be described later displays the setting screen as illustrated in FIG. 18 on the display unit 111 in response to an operation on the input unit 112 to allow the administrator to freely select a combination of elements of the context information by a selection operation using the input unit 112. In FIG. 18, for example, if the administrator selects and sets "rotational frequency/motor are identical" and "motor is identical" through the selection operation using the input unit 112, the hashing unit 108 performs hashing on a combination of an element of the rotational frequency and an element of the motor among the elements of the context information, and performs hashing on only the element of the motor.

The hashing unit 108 is implemented by, for example, a program executed by the CPU 61 illustrated in FIG. 3.

The encrypting unit 109 is a functional unit that encrypts the detection information received by the detection information receiving unit 102. The encryption is an example of the data concealing process. The encrypting unit 109 is implemented by, for example, a program executed by the CPU 61 illustrated in FIG. 3.

The feature extracting unit 104 is a functional unit that extracts the feature information used for the determination performed by the determining unit 106 from the detection information encrypted by the encrypting unit 109. The feature extracting unit 104 is implemented by, for example, a program executed by the CPU 61 illustrated in FIG. 3.

The model acquiring unit 105 is a functional unit that acquires a model used for the determination operation performed by the determining unit 106 from a learning device 300a via the second receiving unit 101c. Specifically, the model acquiring unit 105 transmits the context information hashed by the hashing unit 108 and a model acquisition request to the learning device 300a via the second transmitting unit 101d. Upon receiving the model acquisition request, the learning device 300a reads a model corresponding to the received hashed context information from the storage unit 309, and transmits the model to the model acquiring unit 105 of the diagnosis device 100a via the transmitting unit 301a. The model acquiring unit 105 is implemented by, for example, a program executed by the CPU 61 illustrated in FIG. 3.

The determining unit 106 is a functional unit that determines whether the operation performed by the processing machine 200 is normal, by using the feature information extracted by the feature extracting unit 104 and by using the model that corresponds to the context information hashed by the hashing unit 108 and that is acquired by the model acquiring unit 105. For example, the determining unit 106 requests the feature extracting unit 104 to extract the feature information from the detection information encrypted by the encrypting unit 109. The determining unit 106 calculates a likelihood indicating the degree of likelihood that the feature information extracted from the encrypted detection information is normal, by using a corresponding model. The determining unit 106 compares the likelihood and a threshold determined in advance, and determines that the operation performed by the processing machine 200 is normal when the likelihood is equal to or greater than the threshold, for example. Furthermore, the determining unit 106 determines that the operation performed by the processing machine 200 is abnormal when the likelihood is smaller than the threshold. The determining unit 106 is implemented by, for example, a program executed by the CPU 61 illustrated in FIG. 3.

The display control unit 110 is a functional unit that controls a display operation performed by the display unit 111. The display control unit 110 is implemented by, for example, a program executed by the CPU 61 illustrated in FIG. 3.

The display unit 111 is a functional unit that displays various kinds of information under the control of the display control unit 110. The display unit 111 is implemented by, for example, the display 66b illustrated in FIG. 3.

The input unit 112 is a functional unit to perform operations, such as input of a character, a numeral, or the like, selection of various instructions, and movement of a cursor. The input unit 112 is implemented by, for example, the input device 66a illustrated in FIG. 3.

Each of the functional units (the communication control unit 101, the detection information receiving unit 102, the processing information acquiring unit 103, the feature extracting unit 104, the model acquiring unit 105, the determining unit 106, the hashing unit 108, the encrypting unit 109, and the display control unit 110) of the diagnosis device 100a illustrated in FIG. 14 may be implemented by causing the CPU 61 illustrated in FIG. 3 to execute a program, that is, by software, may be implemented by hardware, such as an IC, or may be implemented by a combination of software and hardware.

As illustrated in FIG. 14, the learning device 300a includes the communication control unit 301, a detection information acquiring unit 302a (a fifth acquiring unit), a processing information acquiring unit 303a (a fourth acquiring unit), a feature extracting unit 304a, a generating unit 305a, a determining unit 306a (a second determining unit), a combining unit 307a, a model selecting unit 308a (a selecting unit), and the storage unit 309. Operations performed by the communication control unit 301 and the storage unit 309 are the same as the operations described in the first embodiment.

The detection information acquiring unit 302a is a functional unit that, when the generating unit 305a generates a model, acquires the detection information that corresponds to the hashed context information acquired by the processing information acquiring unit 303a and that is encrypted by the encrypting unit 109 from the diagnosis device 100a via the receiving unit 301b. The detection information acquiring unit 302a associates the acquired encrypted detection information (the sensor data) with the hashed context information (the hash value) as in a table illustrated in FIG. 20 to be described later for example, and stores the detection information in the storage unit 309. The detection information acquiring unit 302a is implemented by, for example, a program executed by the CPU 61 illustrated in FIG. 3.

The processing information acquiring unit 303a is a functional unit that acquires the context information (processing information) hashed by the hashing unit 108 via the receiving unit 301b. The processing information acquiring unit 303a is implemented by, for example, a program executed by the CPU 61 illustrated in FIG. 3.

The feature extracting unit 304a is a functional unit that extracts feature information used to generate a model by the generating unit 305a, from the encrypted detection information acquired by the detection information acquiring unit 302a. That is, the feature extracting unit 304a extracts the feature information without decrypting the encrypted detection information. The feature extracting unit 304a is implemented by, for example, a program executed by the CPU 61 illustrated in FIG. 3.

Figures 19, 20, 21:
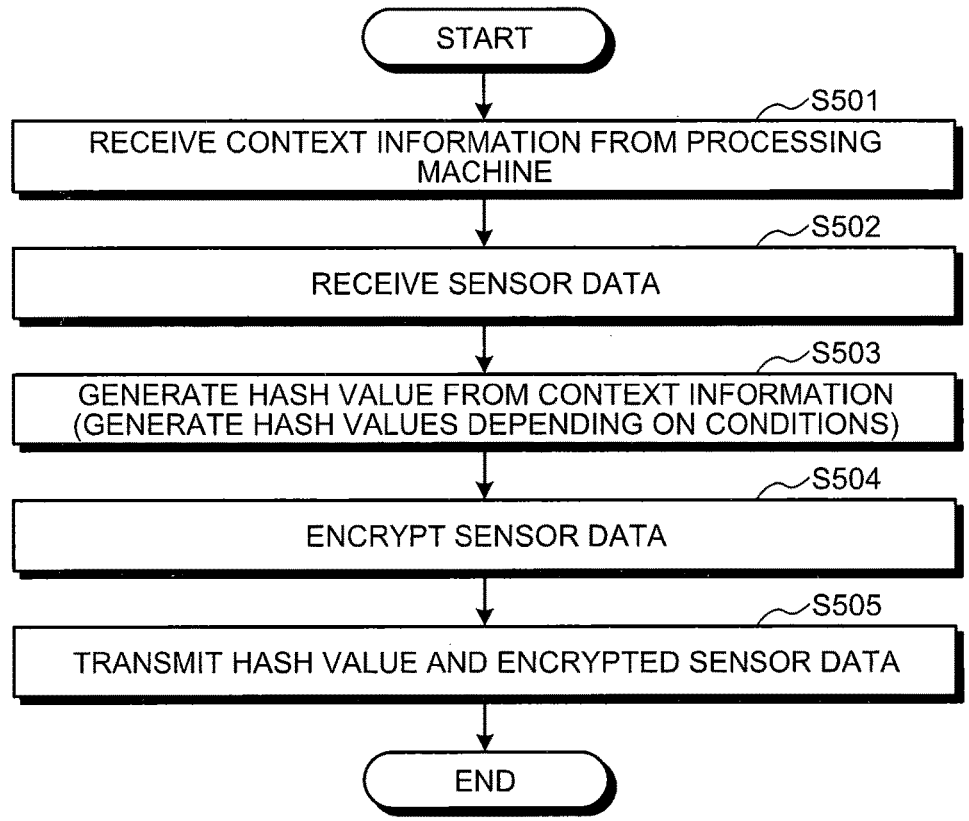
FIG. 19 is a flowchart illustrating an example of an operation of encrypting and transmitting context information and sensor data in the second embodiment.
FIG. 20 is a schematic diagram illustrating an example of a table for associating a hash value and the sensor data.
FIG. 21 is a schematic diagram illustrating an example of a table for associating the hash value and a model.

The generating unit 305a is a functional unit that generates a model corresponding to the hashed context information (the hash value) acquired by the processing information acquiring unit 303a, from the feature information extracted by the feature extracting unit 304a. The generating unit 305a associates the generated model with the hashed context information (the hash value) as in a table as illustrated in FIG. 21 to be described later for example, and stores the model in the storage unit 309. The generating unit 305a is implemented by, for example, a program executed by the CPU 61 illustrated in FIG. 3. The method of generating a model is the same as the method described above in the first embodiment.

The determining unit 306a is a functional unit that determines whether any hash values (any pieces of the hashed context information) in the table illustrated in FIG. 21 to be described later are identical or similar to each other. The determining unit 306a is implemented by, for example, a program executed by the CPU 61 illustrated in FIG. 3.

The combining unit 307a is a functional unit that reads, from the storage unit 309, a plurality of models corresponding to the identical or similar hash values determined by the determining unit 306a, and generates a new model by combining the read models. The method of combining the models is the same as the method described above in the first embodiment. The combining unit 307a does not necessarily have to generate a new model by directly combining the models corresponding to the identical or similar hash values determined by the determining unit 306a. For example, the combining unit 307a may generate a new model from a plurality of pieces of the feature information extracted from a plurality of pieces of the encrypted detection information corresponding to the identical or similar hash values determined as above.

The model selecting unit 308a is a functional unit that selects and reads, from the storage unit 309, a model corresponding to the hash value received from the model acquiring unit 105 of the diagnosis device 100a in response to the model acquisition request received together with the hash value, and transmits the model to the model acquiring unit 105 of the diagnosis device 100a via the transmitting unit 301a. The model selecting unit 308a is implemented by, for example, a program executed by the CPU 61 illustrated in FIG. 3.

Each of the functional units (the transmitting unit 301a, the detection information acquiring unit 302a, the processing information acquiring unit 303a, the feature extracting unit 304a, the generating unit 305a, the determining unit 306a, the combining unit 307a, the model selecting unit 308a, and the storage unit 309) of the learning device 300a illustrated in FIG. 14 may be implemented by causing the CPU 61 illustrated in FIG. 3 to execute a program, that is, by software, may be implemented by hardware, such as an IC, or may be implemented by a combination of software and hardware.

Furthermore, each of the functional units of the diagnosis device 100a, the processing machine 200, and the learning device 300a illustrated in FIG. 14 are functionally conceptual, and do not necessarily have to be configured in the same manner. For example, a plurality of the functional units illustrated as independent functional units in FIG. 14 may be configured as a single functional unit. Alternatively, the function of a single functional unit in FIG. 14 may be divided into a plurality of functions as a plurality of functional units.

Operation of Transmitting Detection Information by Diagnosis Device

FIG. 19 is a flowchart illustrating an example of an operation of encrypting and transmitting the context information and the sensor data in the second embodiment. FIG. 20 is a schematic diagram illustrating an example of the table for associating the hash value with the sensor data. FIG. 21 is a schematic diagram illustrating an example of the table for associating the hash value with the model. With reference to FIG. 19 to FIG. 21, the operation of transmitting the encrypted detection information performed by the diagnosis device 100a and a model generation process performed by the learning device 300 according to the second embodiment will be described.

The first receiving unit 101a receives the context information transmitted from the processing machine 200 (Step S501). The processing information acquiring unit 103 acquires the context information received by the first receiving unit 101a.

The detection information receiving unit 102 receives the detection information (the sensor data) transmitted from the processing machine 200 (Step S502).

The hashing unit 108 performs hashing to obtain a hash value by applying a hash function to the context information acquired by the processing information acquiring unit 103 (Step S503). The hashing unit 108 may obtain a plurality of the hash values from the context information depending on conditions. The method of obtaining the hash value is as described above.

The encrypting unit 109 encrypts the detection information received by the detection information receiving unit 102 (Step S504).

The processing information acquiring unit 103 (the first transmitting unit) transmits the hash value obtained through the hashing performed by the hashing unit 108 to the learning device 300a via the second transmitting unit 101d (Step S505). The detection information receiving unit 102 (the second transmitting unit) transmits the detection information encrypted by the encrypting unit 109 to the learning device 300a via the second transmitting unit 101d (Step S505). The processing information acquiring unit 303a of the learning device 300a acquires the hashed context information transmitted from the diagnosis device 100a (the processing information acquiring unit 103) via the receiving unit 301b. The detection information acquiring unit 302a of the learning device 300a acquires the encrypted detection information transmitted from the diagnosis device 100a (the detection information receiving unit 102) via the receiving unit 301b. The detection information acquiring unit 302a associates the acquired encrypted detection information (the sensor data) with the hashed context information (the hash value) as in the table illustrated in FIG. 20 for example, and stores the detection information in the storage unit 309.

The feature extracting unit 304a extracts the feature information to be used to generate a model by the generating unit 305a, from the encrypted detection information acquired by the detection information acquiring unit 302a.

The generating unit 305a generates a model corresponding to the hashed context information (the hash value) acquired by the processing information acquiring unit 303a, from the feature information extracted by the feature extracting unit 304a. The generating unit 305a associates the generated model with the hashed context information (the hash value) as in the table illustrated in FIG. 21 for example, and stores the model in the storage unit 309.

Meanwhile, while all of the hash values illustrated in FIG. 21 are different from each other, the hash value and the model stored in the table need not have a one-to-one relationship, but may be stored in a many-to-many relationship. For example, even when the hash value is identical (that is, the element of the context information is identical), corresponding detection information is different in each case and a generated model is also different in each case. In this case, a plurality of models are associated with the single hash value and can be subjected to a model combination process described below.

Model Combination Process Performed by Learning Device

Figure 22:
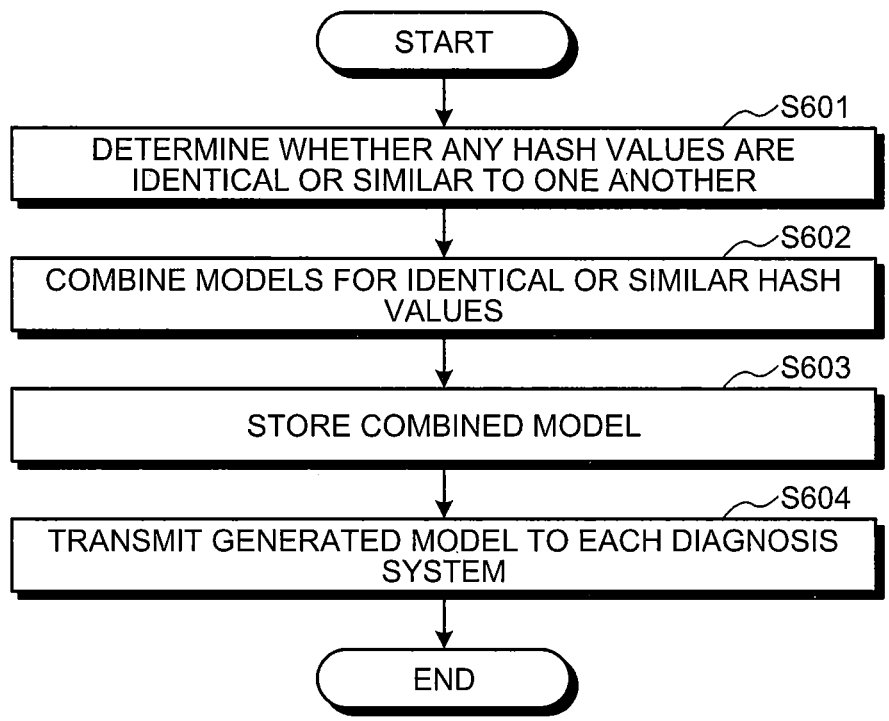
FIG. 22 is a flowchart illustrating an example of a model combination process in the second embodiment.

FIG. 22 is a flowchart illustrating an example of the model combination process in the second embodiment. With reference to FIG. 22, the model combination process performed by the learning device 300a according to the second embodiment will be described. It is assumed that the table in which the model generated by the generating unit 305a and the hash value are associated as illustrated in FIG. 21 is stored in the storage unit 309.

Step S601

The determining unit 306a refers to the table stored in the storage unit 309, which is illustrated in FIG. 21, and determines whether any hash values (any pieces of the hashed context information) are identical or similar to each other. If the hash values obtained through hashing using a specific hash function have characteristics such that the hash values are totally different from each other when original values of pieces of the context information are only slightly different from each other, it is difficult to determine the similarity between the hash values; therefore, in this case, it is sufficient to determine whether any hash values are identical to each other. Then, the process proceeds to Step S602.

Step S602

The combining unit 307a reads, from the storage unit 309, a model corresponding to each of the identical or similar hash values determined by the determining unit 306a, and generates a new model by combining the read models. Then, the process proceeds to Step S603.

Step S603

The combining unit 307a stores the new combined model in the storage unit 309. Then, the process proceeds to Step S604.

Step S604

Upon receiving the model acquisition request from the model acquiring unit 105 of the diagnosis device 100a, the model selecting unit 308a selects and reads, from the storage unit 309, a model corresponding to the hash value that is received together with the model acquisition request, and transmits the model to the model acquiring unit 105 of the diagnosis device 100a via the transmitting unit 301a.

The model combination process is performed at Steps S601 to S603 as described above, and a corresponding model is transmitted to the diagnosis device 100a in response to a request from the diagnosis device 100a at Step S604.

Diagnosis Process Performed by Diagnosis System

Figure 23:
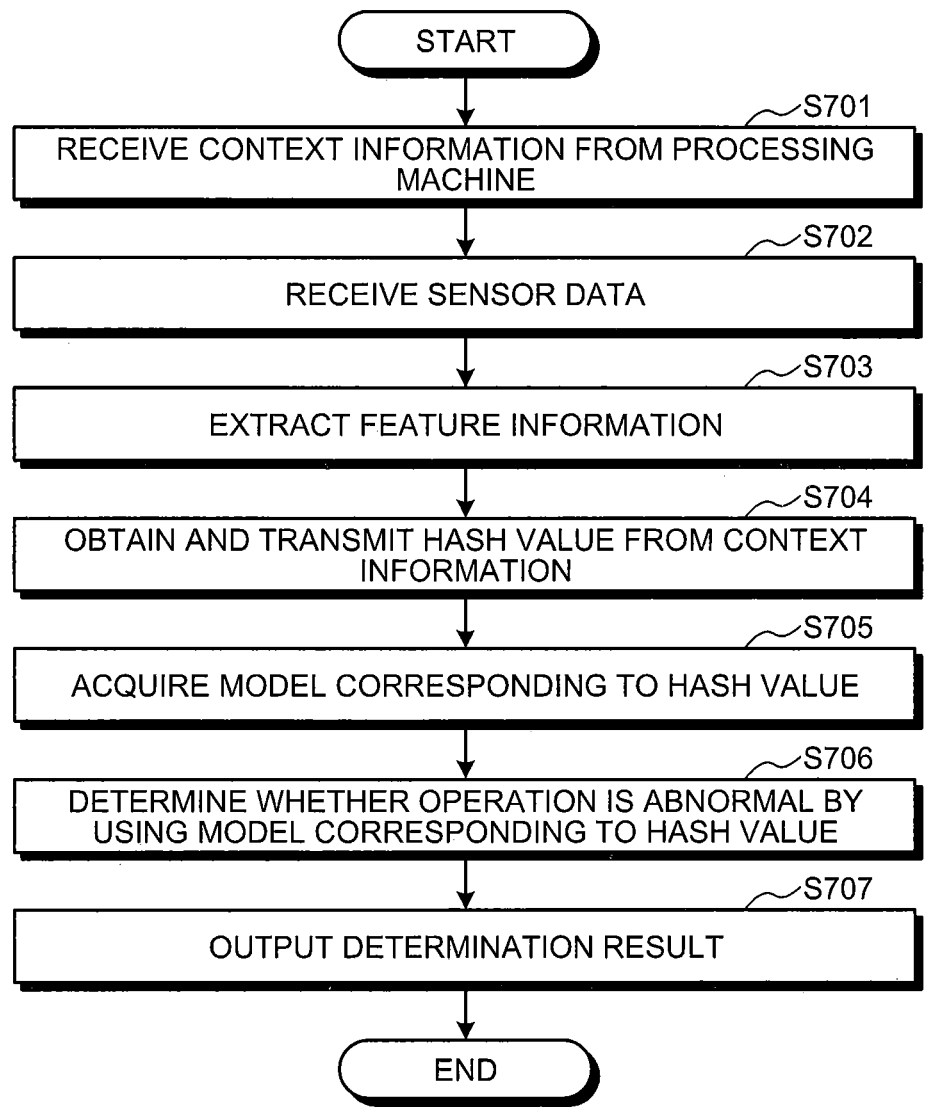
FIG. 23 is a flowchart illustrating an example of a diagnosis process in the second embodiment.

FIG. 23 is a flowchart illustrating an example of the diagnosis process in the second embodiment. With reference to FIG. 23, the diagnosis process performed by the diagnosis system in the second embodiment will be described.

As described above, the numerical control unit 201 of the processing machine 200 sequentially transmits the context information indicating a current operation to the diagnosis device 100a. The first receiving unit 101a receives the context information transmitted from the processing machine 200 as described above (Step S701). The processing information acquiring unit 103 acquires the context information received by the first receiving unit 101a.

The detecting unit 211 of the processing machine 200 sequentially outputs the detection information at the time of processing. The detection information receiving unit 102 receives the detection information (the sensor data) transmitted from the processing machine 200 as described above (Step S702).

The encrypting unit 109 encrypts the detection information received by the detection information receiving unit 102. The feature extracting unit 104 extracts the feature information from the detection information encrypted by the encrypting unit 109 (Step S703).

The hashing unit 108 performs hashing to obtain a hash value by applying a hash function to the context information acquired by the processing information acquiring unit 103. The model acquiring unit 105 transmits the context information (the hash value) hashed by the hashing unit 108 and the model acquisition request to the learning device 300a via the second transmitting unit 101d (Step S704). Upon receiving the model acquisition request, the learning device 300a reads a model corresponding to the received hashed context information from the storage unit 309, and transmits the model to the model acquiring unit 105 of the diagnosis device 100a via the transmitting unit 301a. The model acquiring unit 105 acquires the model corresponding to the hash value via the second receiving unit 101c (Step S705).

The determining unit 106 determines whether the processing machine 200 is operating normally by using the feature information extracted by the feature extracting unit 104 and the model that corresponds to the context information hashed by the hashing unit 108 and that is acquired by the model acquiring unit 105 (Step S706). The determining unit 106 outputs a determination result (Step S707). The determination result may be output by any methods. For example, the determining unit 106 may display the determination result on a display device of the diagnosis device 100a (for example, the display 66b illustrated in FIG. 3). Alternatively, the determining unit 106 may output the determination result to an external apparatus.

As described above, upon receiving the context information and the detection information from the processing machine 200, the diagnosis device 100a transmits the hash value obtained by performing hashing on the context information and the encrypted detection information to the learning device 300a. The learning device 300a generates a model from the encrypted detection information and stores the model in association with the hash value. With this operation, even when confidential information is included in the context information and the detection information transmitted to the learning device 300a, it is possible to ensure the security of the information because the context information and the detection information are transmitted after being hashed and encrypted. The hashing unit 108 may perform hashing for each of specific combinations of elements of the context information and obtain hash values. In this case, it becomes possible to categorize each of the combinations of the elements of the context information that may be used, and associate the categories with the detection information. Furthermore, in the learning device 300a, the feature extracting unit 304a extracts the feature information and the generating unit 305a generates a model from the feature information without decrypting the received encrypted detection information. With this operation, it is possible to reduce a load on a process of decrypting information.

While the context information and the detection information are described as targets for a concealing process (hashing and encryption) in the above described embodiments, the targets are not limited to this example. For example, if only the context information includes information that needs to be concealed, it may be possible not to encrypt the detection information.

Third Embodiment

With respect to a diagnosis system according to a third embodiment, a difference from the diagnosis system 1 of the first embodiment will be mainly described. In the first embodiment, whether an operation of the processing machine 200 is normal or abnormal is determined by using a single kind of detection information. However, the number of kinds of detection information used for determination is not limited to one, and two or more kinds of detection information may be used. The diagnosis system according to the third embodiment determines an abnormality of the processing machine 200 by using a plurality of kinds of the detection information. The entire configuration of the diagnosis system and the hardware configurations of a processing machine, a diagnosis device, and a learning device in the third embodiment are the same as those described in the first embodiment.

Functional Block Configuration and Operation of Diagnosis System

Figure 24:
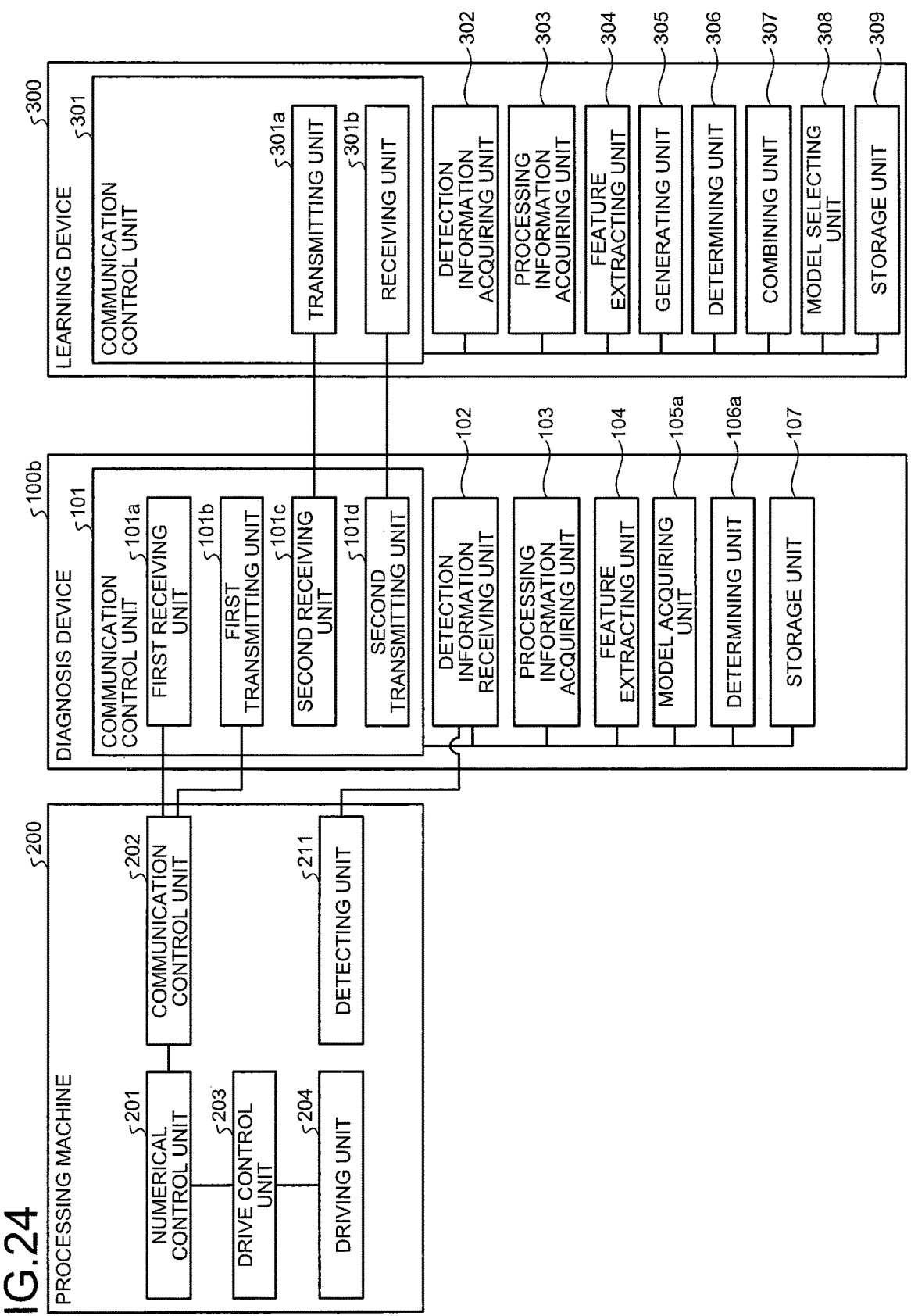
FIG. 24 is a schematic diagram illustrating an example of a functional block configuration of a diagnosis system according to a third embodiment.

FIG. 24 is a schematic diagram illustrating an example of a functional block configuration of the diagnosis system according to the third embodiment. With reference to FIG. 24, the functional block configuration and operations of the diagnosis system and the processing machine 200 according to the third embodiment will be described. The functional block configurations and the operations of the processing machine 200 and the learning device 300 are the same as the configuration and the operations described in the first embodiment.

As illustrated in FIG. 24, a diagnosis device 100b includes the communication control unit 101, the detection information receiving unit 102 (the second acquiring unit), the processing information acquiring unit 103 (the first acquiring unit), the feature extracting unit 104, a model acquiring unit 105a (a third acquiring unit), a determining unit 106a (a first determining unit), and the storage unit 107.

In the third embodiment, functions of the model acquiring unit 105a and the determining unit 106a are different from those of the first embodiment. Other configurations and functions are the same as those of the diagnosis device 100 of the first embodiment as illustrated in the block diagram of in FIG. 4; therefore, the same components are denoted by the same symbols and the same explanation will not be repeated.

The model acquiring unit 105a is a functional unit that acquires a model used in a determination operation performed by the determining unit 106a, from the learning device 300 via the second receiving unit 101c. Specifically, the model acquiring unit 105a transmits a plurality of elements of the context information acquired by the processing information acquiring unit 103 and a model acquisition request to the learning device 300 via the second transmitting unit 101d. Upon receiving the model acquisition request, the learning device 300 reads models corresponding to the respective elements of the received context information from the storage unit 309, and transmits the models to the model acquiring unit 105a of the diagnosis device 100b via the transmitting unit 301a. The model acquiring unit 105a is implemented by, for example, a program executed by the CPU 61 illustrated in FIG. 3.

The determining unit 106a is a functional unit that determines whether an operation performed by the processing machine 200 is normal or not by using a plurality of pieces of the detection information. For example, the determining unit 106a changes the detection information used for the determination depending on the context information. The determining unit 106a is implemented by, for example, a program executed by the CPU 61 illustrated in FIG. 3.

Detailed Example of Diagnosis Process

Figures 25, 26:
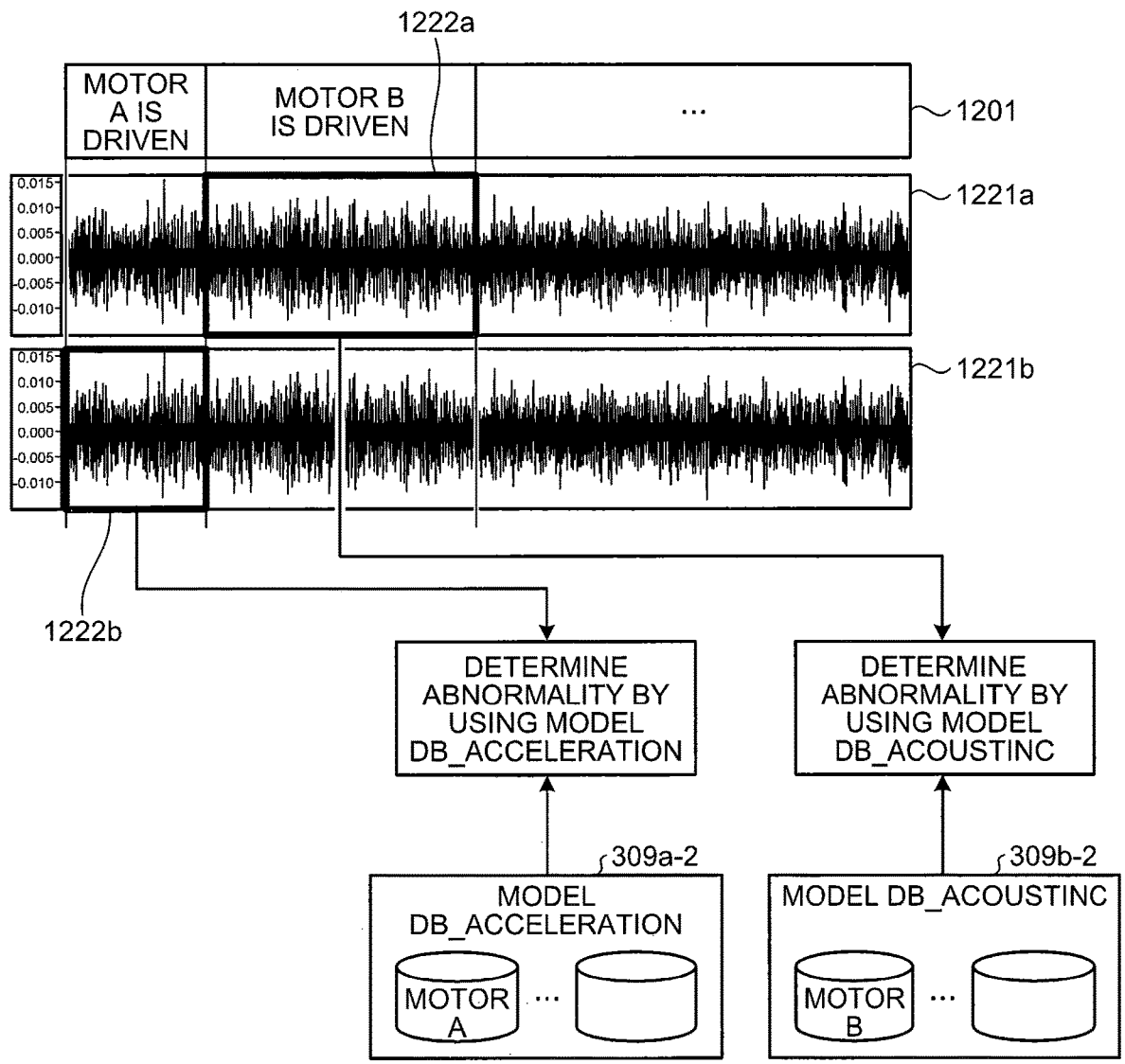
FIG. 25 is a schematic diagram for explaining a detailed example of a process according to the third embodiment.
FIG. 26 is a schematic diagram illustrating an example of a data structure of correspondence information used to determine detection information.

FIG. 25 is a schematic diagram for explaining a detailed example of a process according to the third embodiment. In the example in FIG. 25, a context information string 1201 and a plurality of kinds of detection information strings 1221a and 1221b are received. The detection information string 1221a is, for example, acoustic data. The detection information string 1221b is, for example, acceleration data.

When a piece of context information indicates that the "motor A is driven", the determining unit 106a performs determination by using feature information extracted from a piece of detection information 1222b, which is obtained in a period corresponding to the piece of context information, in the detection information string 1221b. In this case, the determining unit 106a uses a model "motor A" that corresponds to the piece of context information and that is acquired from a model DB_acceleration in a storage unit 309a-2 of the learning device 300 by the model acquiring unit 105a.

When a piece of context information indicates that the "motor B is driven", the determining unit 106a performs determination by using feature information extracted from a piece of detection information 1222*a*, which is obtained in a period corresponding to the piece of context information, in the detection information string 1221*a*. In this case, the determining unit 106*a* uses a model "motor B" that corresponds to the piece of context information and that is acquired from a model DB_acoustic in a storage unit 309*b*-2 of the learning device 300 by the model acquiring unit 105*a*.

A piece of detection information corresponding to a piece of context information may be determined by using correspondence information stored in the storage unit 107, for example. FIG. 26 is a schematic diagram illustrating an example of a data structure of the correspondence information used to determine the piece of detection information. The correspondence information includes, for example, sensor data and context information. The determining unit 106*a* can determine the piece of detection information corresponding to the piece of context information by referring to the correspondence information as described above.

It is of course possible to apply the concealing process described in the second embodiment to the diagnosis system of the third embodiment.

Modifications applicable to the above-described embodiments will be described below. In the following descriptions, it is assumed that a diagnosis system is the diagnosis system 1 according to the first embodiment.

First Modification

The context information string only indicates an interval in which a certain driving unit 212 is driven, and in some cases, it may be difficult to precisely extract an actual processing interval in which, for example, a tool is driven to rotate by the driving unit 212 and is in contact with a material to perform processing. That is, in some cases, the accuracy of the abnormality determination may be reduced.

Figure 27:
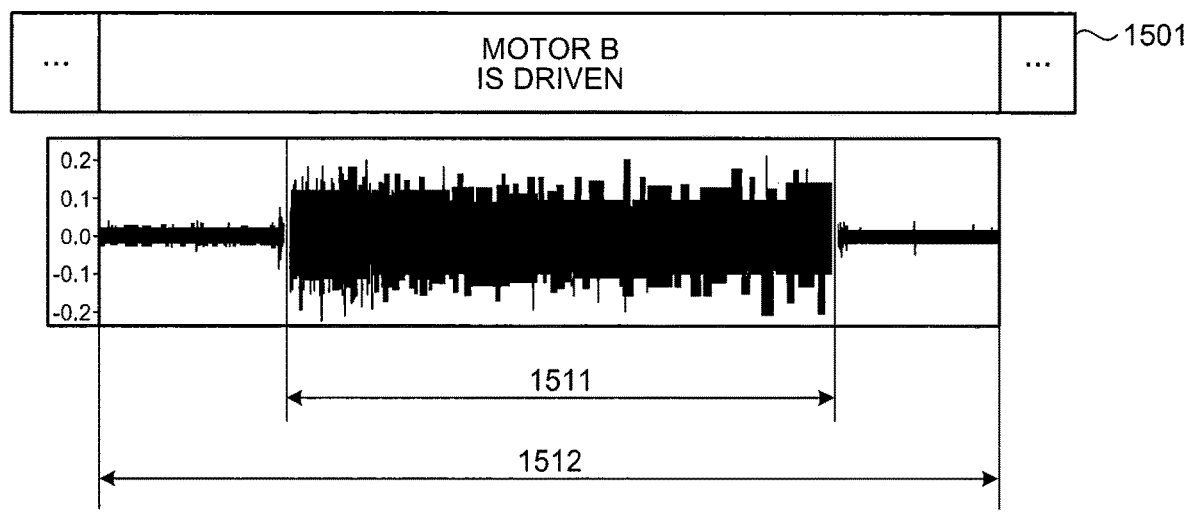
FIG. 27 is a schematic diagram illustrating an example of a relationship between the context information and a processing interval.

FIG. 27 is a schematic diagram illustrating an example of a relationship between the context information and the processing interval. Context information 1501 indicates that the motor B is driven. If only the context information 1501 is used, for example, detection information corresponding to a waveform interval 1512 is specified in certain detection information. However, an interval in which a material is actually processed corresponds to a waveform interval 1511. For example, if acoustic data is used as the detection information, the waveform interval 1511 corresponds to an interval of acoustic data that is detected when a tool is in contact with the material and sounds are generated.

Therefore, in a first modification, an actual processing interval is specified based on a combination of the context information and the detection information. Specifically, the determining unit 106 determines a period used for determination in a certain period specified by the received context information on the basis of the received detection information, and performs the determination by using the detection information and the model in the determined period.

Figure 28:
FIG. 28 is a schematic diagram illustrating an example of a method of specifying the processing interval.

For example, the determining unit 106 obtains a processing interval by specifying a time at which the characteristic of the detection information changes. FIG. 28 is a schematic diagram illustrating an example of a method of specifying the processing interval. In the example in FIG. 28, the determining unit 106 specifies a time 1601 at which an amplitude of the detection information changed so as to exceed thresholds (for example, "a" and "−a"), and a subsequent time 1602 at which the amplitude changed so as to fall below the thresholds. The determining unit 106 extracts an interval 1611 between the time 1601 and the time 1602. The determining unit 106 performs determination by using the feature information extracted from the detection information in the interval 1611. With this operation, it becomes possible to perform determination with higher accuracy by using the detection information in an interval corresponding to the actual processing interval.

Second Modification

As described above, to determine whether an operation is normal or abnormal, it may be possible to use the value of the likelihood itself or a value indicating a variation of the likelihood. In a second modification, an example will be described in which the value indicating a variation of the likelihood is used. As the value indicating a variation of the likelihood, for example, a distribution of the likelihood may be used. For example, a distribution of the likelihood in an interval X is calculated by Equation (1) below. $n_X$ is the number of frames in the interval X, k is a frame index, $x_i$ is the likelihood of a frame i (a frame likelihood), and $\mu_X$ is an average of the frame likelihoods in the interval X. The frame corresponds to a unit interval for calculating the likelihood.

$$V_X(k) = \frac{1}{n_X} \sum_{i=k-\frac{n_X-1}{2}}^{k+\frac{n_X-1}{2}} (x_i - \mu_X)^2 \quad (1)$$

Furthermore, a score value obtained based on the distribution as indicated by Equation (1) may be used for the determination. For example, a determination value r(k) indicated by Equation (2) below may be used for the determination.

$$r(k) = V_S(k)/V_L(k) \quad (2)$$

S and L indicate types of the interval X. S represents a short interval and L represents a long interval. $V_S(k)$ represents a value calculated by Equation (1) for the short interval. $V_L(k)$ represents a value calculated by Equation (1) for the long interval. With respect to each of S and L, $n_S$ and $\mu_S$, and, $n_L$ and $\mu_L$, which are values corresponding to $n_X$ and $\mu_X$, are calculated.

Figure 29:
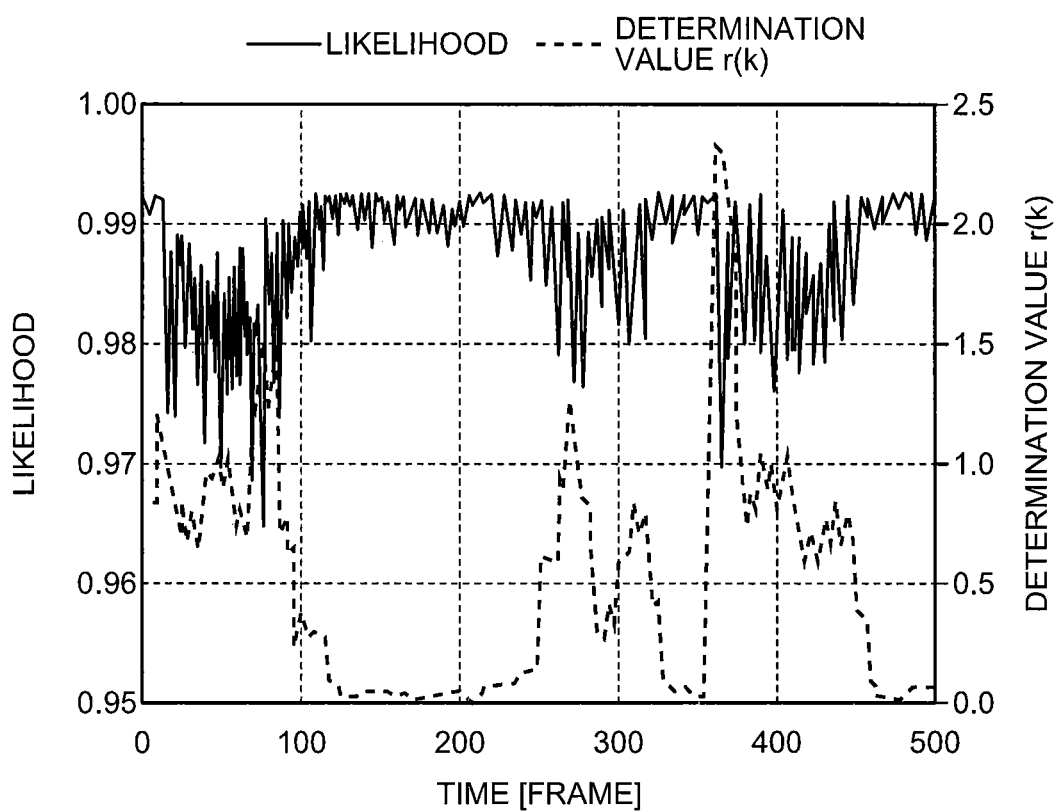
FIG. 29 is a graph illustrating an example of a relationship between a likelihood and a determination value r(k).

FIG. 29 is a graph illustrating an example of a relationship between the likelihood and the determination value r(k). In a determination method in which the likelihood and a threshold are compared, if the threshold is set to 0.97 for example, it is determined that an operation is normal in 200 to 300 frames. In contrast, in a method in which the determination value r(k) and a threshold (for example, 1.0) is compared, it becomes possible to detect a variation of the likelihood in the 200 to 300 frames and determine that an operation is abnormal.

Third Modification

The determining unit 106 may determine and output a temporal change in the likelihood in addition to determining whether an operation is normal or abnormal by comparing the likelihood and the threshold. For example, if a single model for a normal operation is used, the determining unit 106 may store the calculated likelihood in the storage unit 107 or the like and obtain a change in the likelihood (whether the likelihood is reduced over time or the like).

Figure 30:
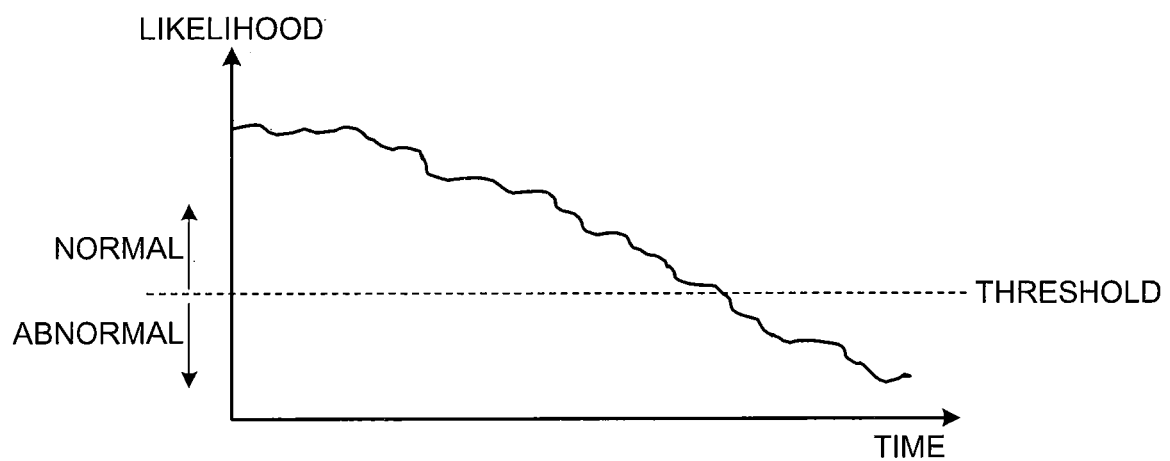
FIG. 30 is a schematic diagram illustrating an example of a temporal change in the likelihood.

FIG. 30 is a schematic diagram illustrating an example of a temporal change in the likelihood. The determining unit 106 can obtain the temporal change in the likelihood by, for example, storing a time at which the determination is performed and the likelihood. The determining unit 106 determines that an operation is abnormal when the likelihood falls below the threshold, similarly to the above-described embodiments. The determining unit 106 may further obtain and output information indicating a temporal change in the likelihood, an estimated time at which the likelihood may fall below the threshold, and the like.

Fourth Modification

Figure 31:
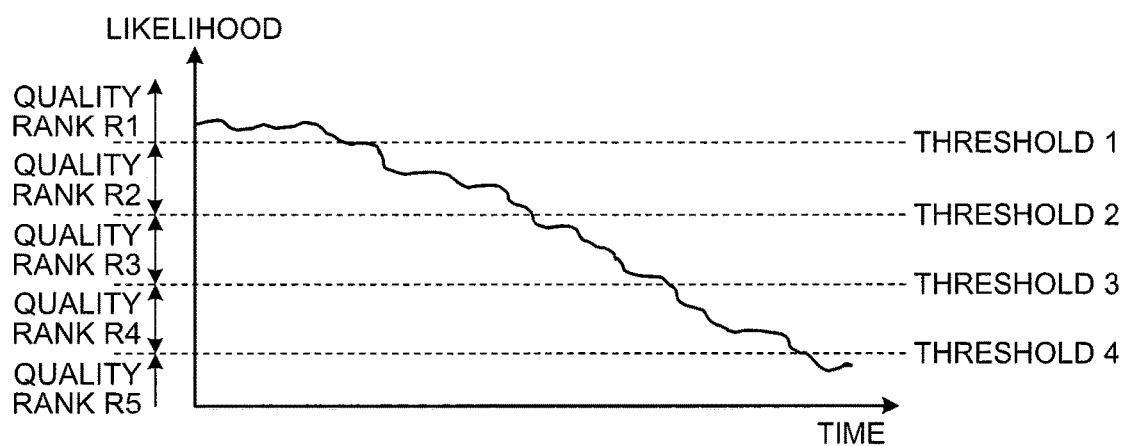
FIG. 31 is a schematic diagram for explaining an example in which a plurality of thresholds are used.
Figure 32:
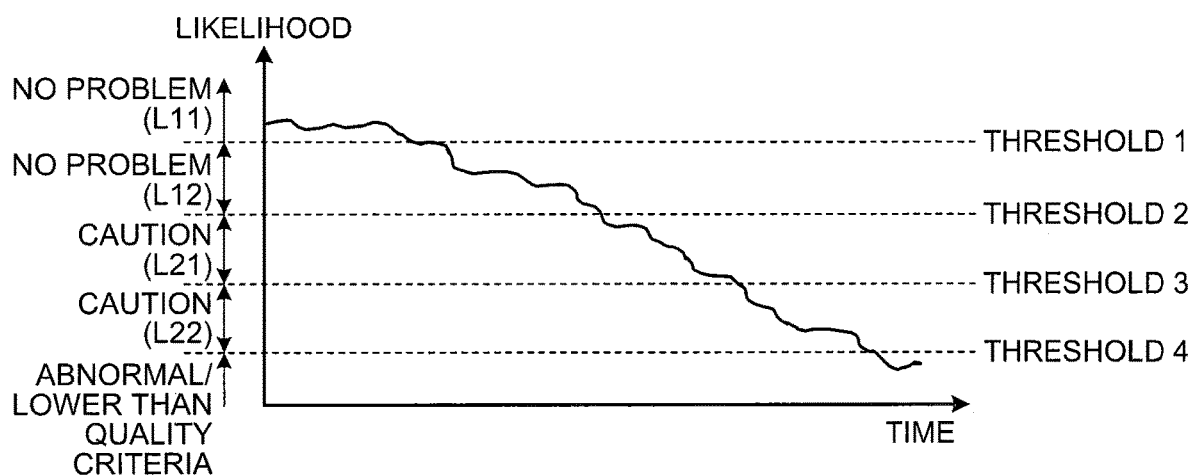
FIG. 32 is a schematic diagram for explaining an example in which a plurality of thresholds are used.

The determining unit 106 may determine the degree (rank or level) of quality by using a plurality of thresholds. FIG. 31 and FIG. 32 are schematic diagrams for explaining examples in which a plurality of thresholds are used. The drawings illustrate examples in which four thresholds (a threshold 1 to a threshold 4) are used; however, the number of the thresholds is not limited to four.

In FIG. 31, an example is illustrated in which a quality rank is divided into five ranks R1 to R5 on the basis of a magnitude relationship with respect to the four thresholds. The determining unit 106 determines and outputs the quality rank by comparing each of the thresholds and the likelihood. The quality rank may be used as, for example, information (quality information) indicating the quality of an object (processed object) processed by the processing machine 200.

In FIG. 32, an example is illustrated in which whether an operation is normal (no problem), a caution is needed, or an operation is abnormal (equal to or below the quality criterion) on the basis of a magnitude relationship with respect to the four thresholds. A normal level is further divided into two levels L11 and L12. Similarly, a cautious level is further divided into two levels L21 and L22. Each of the levels may be further divided into three or more levels.

Fifth Modification

Figures 1, 33:
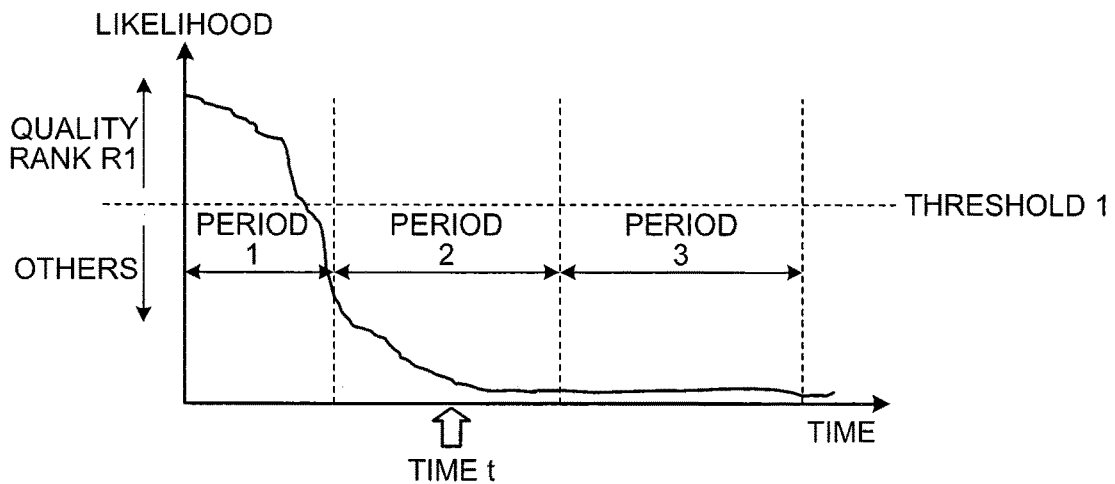
Figures 2, 33:
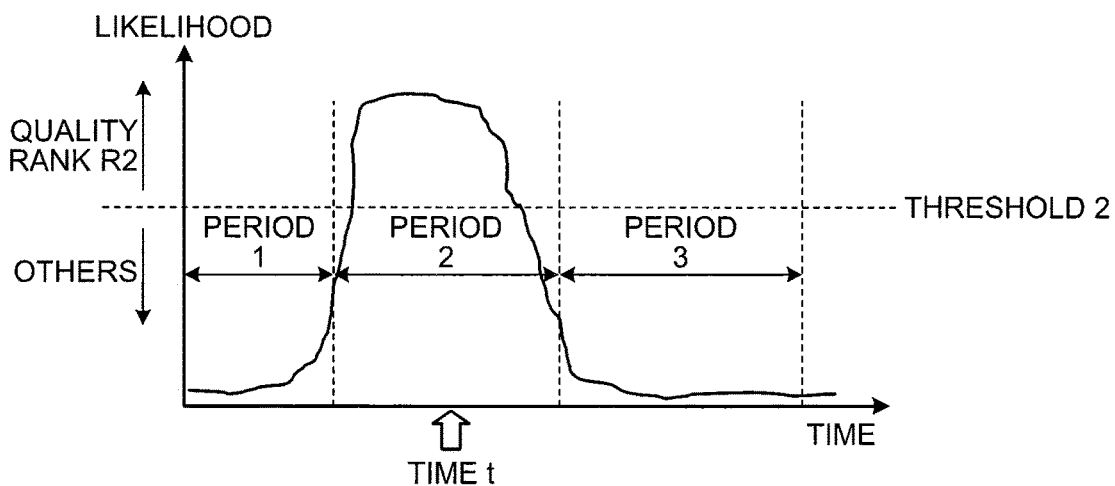
Figures 3, 33:
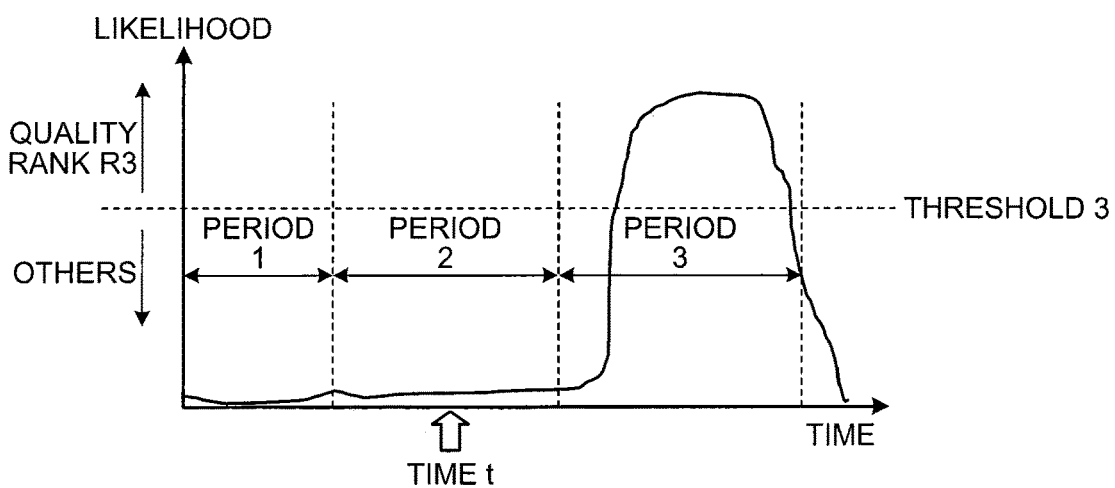

The determining unit 106 may calculate a plurality of likelihoods by using a plurality of models that are determined depending on quality ranks, and may determine a quality rank of a normal operation in addition to determining whether an operation is normal or abnormal. FIG. 33-1 to FIG. 33-3 are schematic diagrams for explaining a determination method according to a fifth modification.

FIG. 33-1, FIG. 33-2, and FIG. 33-3 illustrate examples of likelihoods that are calculated by models for determining quality ranks R1, R2, and R3, respectively. The quality rank R1 indicates a quality obtained when an operation is determined as normal in an early period 1 of a temporal change, for example. The quality rank R2 indicates a quality obtained when an operation is determined as normal in an intermediate period 2 of the temporal change, for example. The quality rank R3 indicates a quality obtained when an operation is determined as normal in a late period 3 of the temporal change, for example.

The determining unit 106 calculates a plurality of likelihoods by using the plurality of models corresponding to the respective quality ranks as described above. In general, the likelihood obtained by any one of the models exceeds a threshold. The determining unit 106 determines a quality rank indicated by the model used to calculate the likelihood that exceeds the threshold, and outputs the quality rank as a determination result. If the likelihood does not exceed the threshold even by using all of the models, the determining unit 106 determines that an operation is abnormal.

The plurality of models may be generated in advance for the respective quality ranks. According to the fifth modification, it becomes possible to determine the level of the quality in addition to simply determining whether an operation is normal or abnormal. Furthermore, it becomes possible to determine a period of the temporal change corresponding to a current time.

Sixth Modification

Figures 1, 34:
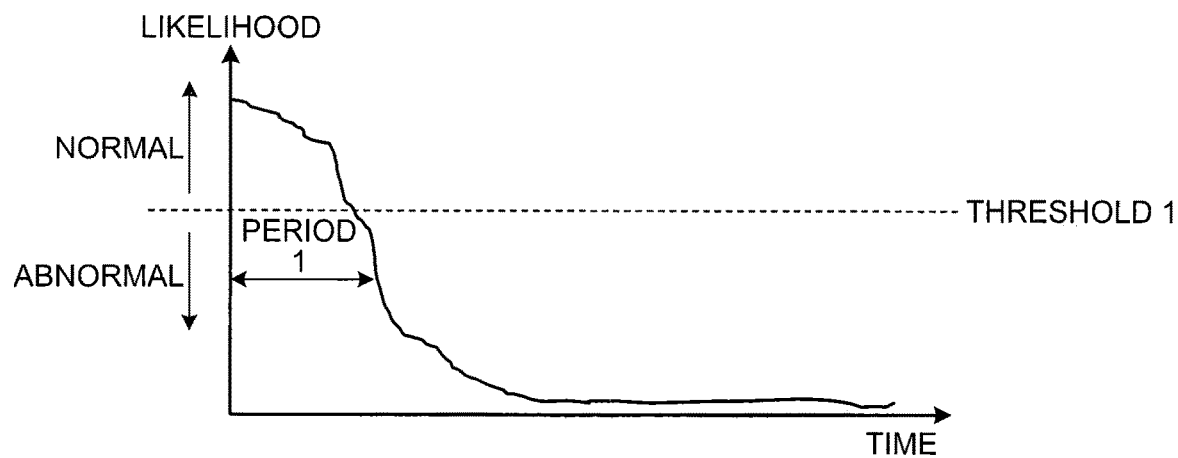
Figures 2, 34:
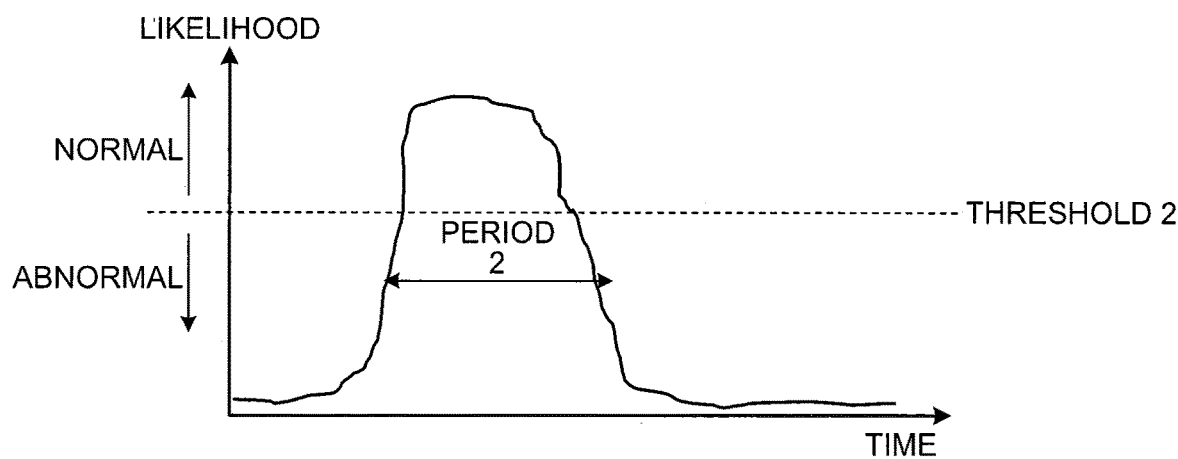
Figures 3, 34:
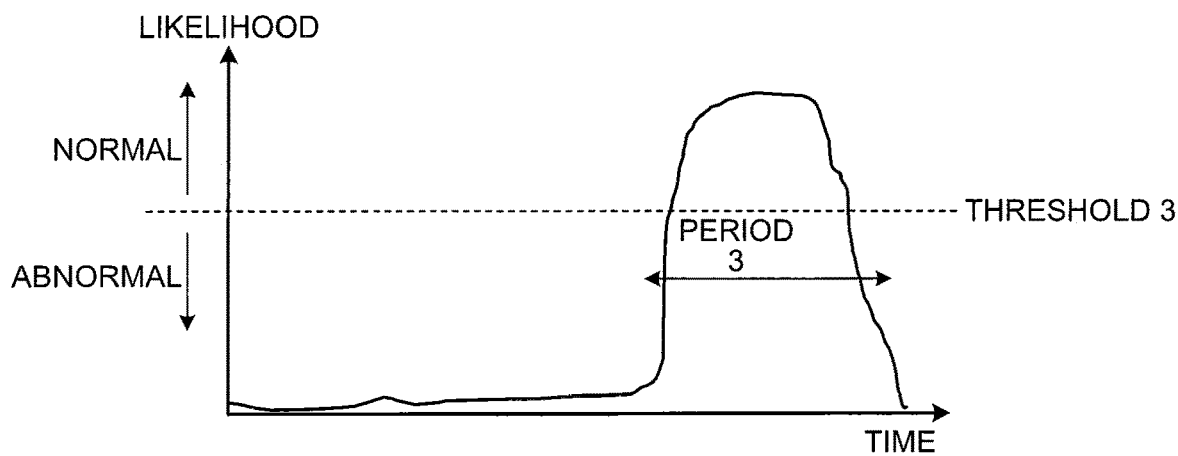

The determining unit 106 may perform determination by changing a plurality of models to be used, depending on an elapsed time. FIG. 34-1 to FIG. 34-3 are schematic diagrams for explaining an example of a determination method according to a sixth modification.

FIG. 34-1, FIG. 34-2, and FIG. 34-3 illustrate examples of likelihoods that are calculated by models generated for a period 1, a period 2, and a period 3, respectively. The period 1, the period 2, and the period 3 correspond to the early period, the intermediate period, and the late period of the temporal change, respectively. The models may be generated in advance by using the detection information in the corresponding periods.

The determining unit 106 determines a period and a corresponding model to be used, by using context information, such as an accumulated use time, for specifying the period, for example. The determining unit 106 determines whether an operation is normal or abnormal by using the determined model. According to the sixth modification, it becomes possible to determine whether a current state corresponds to an appropriate temporal change (a normal state) or deviates from the appropriate temporal change (an abnormal state).

Seventh Modification

The determining unit 106 may perform determination by using a model designated from among a plurality of models determined according to the quality ranks. For example, if a processed object of a higher quality is requested, the determining unit 106 uses a model determined for the high quality rank. If a processed object of a normal quality is requested, the determining unit 106 uses a model determined for the quality rank lower than the high quality rank. It may be possible to determine the model to be used by using, for example, the context information received by the first receiving unit 101*a* or the like.

The program executed by the diagnosis device and the learning device in the embodiments and the modifications as described above is distributed by being incorporated in a ROM or the like in advance.

The program executed by the diagnosis device and the learning device in the embodiments and the modifications as described above may be provided as a computer program product by being recorded in a computer readable recording medium, such as a compact disc read only memory (CD-ROM), a flexible disk (FD), a compact disk recordable (CD-R), or a digital versatile disk (DVD) in a computer installable or a computer executable file format.

Furthermore, the program executed by the diagnosis device and the learning device in the embodiments and the modifications as described above may be stored in a computer connected to a network, such as the Internet, and provided by being downloaded via the network. Moreover, the program executed by the diagnosis device and the learning device in the embodiments and the modifications as described above may be provided or distributed via a network, such as the Internet.

Furthermore, the program executed by the diagnosis device and the learning device in the embodiments and the modifications as described above has a module structure including the above-described functional units. As actual hardware, a CPU (one or more processors) reads and executes the program from the ROM, so that the above-described functional units are loaded on a main storage device, generated on a main storage device, and executed by one or more processors. For example, in some example embodiments, a first acquiring unit, a second acquiring unit, a model acquiring unit, a first transmitting unit, a second transmitting unit, and a first determining unit are included in one or more processors of the diagnosis device, and a fourth acquiring unit, a fifth acquiring unit, a generating unit, a second determining unit, a combining unit, and a selecting unit are included in one or more processors of the learning device.

REFERENCE SIGNS LIST 1, 1_1, 1_2 Diagnosis system
2 Network
51 CPU
52 ROM
53 RAM
54 Communication OF
55 Drive control circuit
56 Motor
57, 57_1, 57_2 Sensor
58 Bus
61 CPU
62 ROM
63 RAM
64 Communication I/F
65 Sensor I/F
66 Input-output I/F
66a Input device
66b Display
67 Auxiliary storage device
68 Bus
100, 100a, 100b, 100_1, 100_2 Diagnosis device
101 Communication control unit
101a First receiving unit
101b First transmitting unit
101c Second receiving unit
101d Second transmitting unit
102 Detection information receiving unit
103 Processing information acquiring unit
104 Feature extracting unit
105, 105a Model acquiring unit
106, 106a Determining unit
107 Storage unit
108 Hashing unit
109 Encrypting unit
110 Display control unit
111 Display unit
112 Input unit
200, 200_1, 200_2 Processing machine
201 Numerical control unit
202 Communication control unit
203 Drive control unit
204 Driving unit
211 Detecting unit
300, 300a Learning device
301 Communication control unit
301a Transmitting unit
301b Receiving unit
302, 302a Detection information acquiring unit
303, 303a Processing information acquiring unit
304, 304a Feature extracting unit
305, 305a Generating unit
306, 306a Determining unit
307, 307a Combining unit
308, 308a Model selecting unit
309, 309a_2, 309b_2 Storage unit
701, 701-2 Context information
711a to 711c Detection information
721 Detection information
901 Context information
921 Detection information
1101 Context information
1111a to 1111c Detection information
1201 Context information
1221a, 1221b Detection information
1501 Context information
1511, 1512 Waveform interval
1601, 1602 Time
1611 Interval

CITATION LIST

Patent Literature

PTL 1: Japanese Patent No. 5363927

The invention claimed is:
1. A diagnosis system comprising:
a diagnosis device that determines whether an operation performed by a target device is normal or not; and
a learning device that stores at least one model used for a determination operation performed by the diagnosis device, wherein
the diagnosis device includes
a first acquiring unit configured to acquire, from the target device, a piece of context information corresponding to a current operation among a plurality of pieces of context information determined for respective kinds of operations performed by the target device;
a second acquiring unit configured to acquire a piece of detection information output from a detecting unit that detects a physical quantity that changes depending on operations performed by the target device;
a first transmitting unit configured to transmit the piece of the context information acquired by the first acquiring unit to the learning device;
a second transmitting unit configured to transmit the piece of the detection information acquired by the second acquiring unit to the learning device;
a model acquiring unit configured to transmit the piece of the context information acquired by the first acquiring unit and a model acquisition request to the learning device, and acquire a model corresponding to the piece of the context information from the learning device; and
a first determining unit configured to determine whether an operation performed by the target device is normal or not by using the piece of the detection information acquired by the second acquiring unit and the model acquired by the model acquiring unit, and
the learning device includes
a fourth acquiring unit configured to acquire the piece of the context information transmitted from the first transmitting unit;
a fifth acquiring unit configured to acquire the piece of the detection information transmitted from the second transmitting unit;
a generating unit configured to generate a model from the piece of the detection information corresponding to the piece of the context information acquired by the fourth acquiring unit;
a second determining unit configured to determine whether any pieces of context information among the plurality of pieces of context information are identical or similar to each other;
a combining unit configured to combine models corresponding to the pieces of context information deter- mined to be identical or similar to each other by the second determining unit; and a selecting unit configured to, in response to the model acquisition request acquired from the model acquiring unit, select a model corresponding to the piece of the context information received together with the model acquisition request and transmit the model to the model acquiring unit, wherein the first acquiring unit, the second acquiring unit, the model acquiring unit, the first transmitting unit, the second transmitting unit, and the first determining unit are included in one or more processors of the diagnosis device, and wherein the fourth acquiring unit, the fifth acquiring unit, the generating unit, the second determining unit, the combining unit, and the selecting unit are included in one or more processors of the learning device.

2. The diagnosis system according to claim 1, wherein the first transmitting unit transmits the piece of the context information acquired by the first acquiring unit to the learning device before the second transmitting unit transmits the piece of the detection information corresponding to the piece of the context information, and when the learning device determines that it is necessary to acquire the piece of the detection information corresponding to the piece of the context information and to generate or combine a model from the piece of the detection information on a basis of the piece of the context information transmitted from the first transmitting unit, the second transmitting unit transmits the piece of the detection information to the learning device.

3. The diagnosis system according to claim 1, further comprising:

a hashing unit configured to perform hashing to obtain a hash value of the piece of the context information acquired by the first acquiring unit; and an encrypting unit configured to encrypt the piece of the detection information acquired by the second acquiring unit, wherein the first transmitting unit transmits the hash value that is the piece of the context information hashed by the hashing unit to the learning device, the second transmitting unit transmits the piece of the detection information encrypted by the encrypting unit to the learning device, and the model acquiring unit acquires a model corresponding to the hash value transmitted from the first transmitting unit, from the learning device that determines whether hash values are identical or similar to each other, and combines models generated from pieces of the encrypted detection information respectively corresponding to the identical or similar hash values.

4. The diagnosis system according to claim 3, wherein the hashing unit obtains the hash value by hashing a specific combination of elements of the piece of the context information.

5. The diagnosis system according to claim 1, further comprising a generating unit configured to generate a model from the piece of the detection information corresponding to the piece of the context information acquired by the first acquiring unit, and transmit the generated model to the learning device that stores the piece of the context information and the model in an associated manner.

6. The diagnosis system according to claim 1, wherein the model acquiring unit acquires the model corresponding to the piece of the context information from the learning device that generates the model from the piece of the detection information that is transmitted by the second transmitting unit and that corresponds to the piece of the context information transmitted by the first transmitting unit.

7. The diagnosis system according to claim 1, wherein the second determining unit determines that the pieces of the context information are identical or similar to each other when processing conditions included in the pieces of context information are identical to each other.

8. The diagnosis system according to claim 1, wherein the second determining unit determines that the pieces of the context information are identical or similar to each other when at least one of values of processing conditions included in each of the pieces of context information is in a predetermined range defined by a threshold.

9. The diagnosis system according to claim 1, wherein the second determining unit determines that the pieces of the context information are identical or similar to each other when one of identification information, which is included in each of the pieces of context information and used for identifying a processing device of the target device, and a result of signal processing, which is performed on a piece of the detection information corresponding to each of the pieces of context information, is identical or similar to each other.

10. The diagnosis system according to claim 1, wherein the fourth acquiring unit acquires a hash value that is a piece of context information hashed by the diagnosis device, the fifth acquiring unit acquires a piece of detection information encrypted by the diagnosis device, and the generating unit generates a model from a piece of encrypted detection information corresponding to the hash value acquired by the fourth acquiring unit.

* * * * *